United States Patent [19]

Camras

[11] 3,860,951

[45] Jan. 14, 1975

[54] VIDEO TRANSDUCING APPARATUS

[76] Inventor: Marvin Camras, 560 Lincoln Ave., Glencoe, Ill. 60022

[22] Filed: Sept. 20, 1971

[21] Appl. No.: 182,228

Related U.S. Application Data

[62] Division of Ser. No. 34,504, May 4, 1970, Pat. No. 3,705,954..

[52] U.S. Cl. .................... 358/4

[51] Int. Cl. .................... H04n 9/02

[58] Field of Search ........ 178/5.4 R, 5.4 CD, 6, 6.8, 178/5.8, 6.6 A; 179/1; 358/4

[56] References Cited

UNITED STATES PATENTS

| | | | |
|---|---|---|---|
| 2,768,234 | 10/1956 | Popp | 179/1 |
| 2,892,017 | 6/1959 | Houghton | 178/5.4 CR |
| 3,018,330 | 1/1962 | Soja | 178/5.8 |
| 3,270,131 | 8/1966 | Dinter | 178/6.8 |
| 3,320,370 | 5/1967 | Barry | 178/6.6 A |

*Primary Examiner*—Richard Murray
*Attorney, Agent, or Firm*—Hill, Gross, Simpson, Van Santen, Steadman, Chiara & Simpson

[57] ABSTRACT

Monochrome and color television recording and playback circuitry for coupling of a video magnetic transducer head with a standard broadcast television receiver. High frequency bias having a frequency of less than 4.4 megahertz, and special head configurations of sheet magnetic material having substantially increased cross sectional perimeter for eddy currents accommodating bias frequencies up to ten megahertz.

17 Claims, 14 Drawing Figures

VIDEO TRANSDUCING APPARATUS

CROSS REFERENCES TO RELATED APPLICATIONS

The present application is a division of my copending application Ser. No. 34,504 filed May 4, 1970 (now U.S. Pat. No. 3,705,954 issued Dec. 12, 1972). Said application Ser. No. 34,504 is a division of Ser. No. 649,256 filed June 27, 1967 (now U.S. Pat. No. 3,596,008 issued July 27, 1971), and said application Ser. No. 649,256 is a continuation-in-part of Ser. No. 528,934 filed Feb. 21, 1966 (now abandoned).

Reference is made in compliance with the requirement of 35 U.S.C. 120 to my copending applications Ser. No. 848,992 filed Aug. 11, 1969 (now abandoned), Ser. No. 34,504 filed May 4, 1970 aforesaid, and Ser. No. 62,601 filed Aug. 10, 1970 (now U.S. Pat. No. 3,683,107 issued Aug. 8, 1972).

Said copending application Ser. No. 848,992 is a division of my earlier application Ser. No. 401,832 filed Oct. 6, 1964 (now U.S. Pat. No. 3,495,046 issued Feb. 10, 1970) and refers under 35 U.S.C. 120 to my earlier applications Ser. No. 401,832 aforesaid, Ser. No. 493,271 (now U.S. Pat. No. 3,531,600 issued Sept. 29, 1970), Ser. No. 528,934 filed Feb. 21, 1966 (now abandoned) and Ser. No. 649,256 filed June 27, 1967 aforesaid.

My copending application Ser. No. 34,504 refers under 35 U.S.C. 120 to said earlier applications Ser. No. 401,832, 493,271, 528,934 and 649,256.

Said copending application Ser. No. 62,601 refers under 35 U.S.C. 120 to said applications Ser. No. 401,832 and 493,271.

BACKGROUND OF THE INVENTION

An important problem in the magnetic recording art relates to the need for a video transducer apparatus which can be manufactured at a reasonable cost and yet which will provide quality transducing of television signals, and particularly color television signals and the associated audio signals.

SUMMARY OF THE INVENTION

This invention relates to a wide band transducing system and method, and particularly to a system for recording and/or reproducing black and white and color television signals.

In a preferred embodiment of the present invention three demodulated signals from a conventional color television receiver are transmitted by the circuitry of the present invention to a magnetic tape recorder. Preferably the magnetic transducer heads embody features of the above identified copending applications. Thus each playback head unit preferably has high and low impedance windings thereon with resonant frequencies selected so as to provide a significantly increased range of useful output frequencies. A specifically designed fully transistorized playback amplifier is preferably associated with each head unit for providing in conjunction with the high and low impedance windings a relatively uniform response over the required frequency spectrum.

For maximum economy it is preferred that the playback head units also be used for recording. Preferably the demodulated signals are supplied essentially only to the respective low impedance windings during recording. Further economies (and improved shielding during playback) may be achieved by providing a housing of magnetic shielding material for the head units which also serves as part of cross field magnetic circuits for the respective head units. The cross field magnetic circuits are preferably energized by respective electrical conductors arranged to extend along the sides of the head units and adjacent the record medium path at the transducer gaps for optimum operating efficiency and for maximum simplicity in construction.

The head units and circuit concepts of the present invention may be applied to various transducer configurations such as the right angle or skew angle rotating head configurations wherein the head units scan successive right angle or skew angle tracks on a longitudinally moving, relatively wide record tape. An important contribution of the present invention, however, resides in a system for transducing color television signals by means of stationary head units which scan longitudinal tracks on the record medium. For example, a system has been devised and successfully operated for recording and playing back broadcast color television signals on a ¼ inch magnetic tape record medium with provision for more than one program on the same tape. Using the preferred head configuration, and preferred electric circuitry, such color television signals may be recorded and reproduced with scanning speeds of the head relative to the record medium of the order of 120 inches per second or less and with the use of low cost tape transports, comparable in cost to present home (non-professional) type sound recorder transports. Head-to-tape scanning speeds of 60 inches per second or less are feasible using the teachings of the present invention, in contrast to head velocities of the order of 1,500 inches per second which are typical for present rotating head systems.

It is an object of the present invention to provide an economical television transducing system such as would be particularly suitable for home or educational uses.

Another object of the invention is to provide a wide band transducer system capable of effective transducing of signals with frequency components extending into the megacycle range at head scanning speeds of 120 inches per second or less.

A further object of the invention is to provide a system and method for effectively and economically transducing color television signals; and also to provide such a system which need have an upper frequency response limit of only 2 megacycles per second or even 1 megacycles per second.

Still another object of the invention is to provide a system for recording and/or reproducing television signals together with the related audio intelligence which is readily connected with present commercial broadcast receiver circuitry; and also to provide such a system for color television signals which requires only three video transducer head units, or less.

Yet another object of the invention is to provide a system for recording and/or reproducing television signals such as those which may be obtained from present commercial broadcast receivers, with the use of a low cost tape transport and stationary head units scanning the tape in the direction of tape movement; and also to provide such a system for color television signals.

Another and further object of the invention is to provide a system for recording and reproducing color television and audio signals with the use of broadcast receiver circuitry and a minimum number of additional low cost transistors of the order of 12.

Yet another and further object of the invention is to provide a color television record-playback system having great simplicity of operation with only a record-play switch and a tape transport selector being required (a color balance control being optional).

The objects of the aforementioned applications for patent are also applicable to the present disclosure and are specifically incorporated by reference at this point in the present specification.

It is also an object to provide simple means for phase error correction in video recording and/or playback circuitry.

A further object resides in the provision of a television recording and/or playback system with a high gain-low noise amplifier operable at relatively low tape speeds and with relatively narrow head widths.

Another object resides in a method and apparatus for high fidelity recording and/or reproduction at low cost.

A still further object is to provide a transducer system which is relatively insensitive to record speed variations.

Still another and further object of the invention resides in the provision of a relatively inexpensive and simple system for recording audio signals associated with a color video signal.

Other ojbects, features and advantages of the present invention will be apparent from the following detailed description taken in connection with the accompanying drawings.

DESCRIPTION OF THE STRUCTURE OF THE PREFERRED EMBODIMENTS

Figure 1:
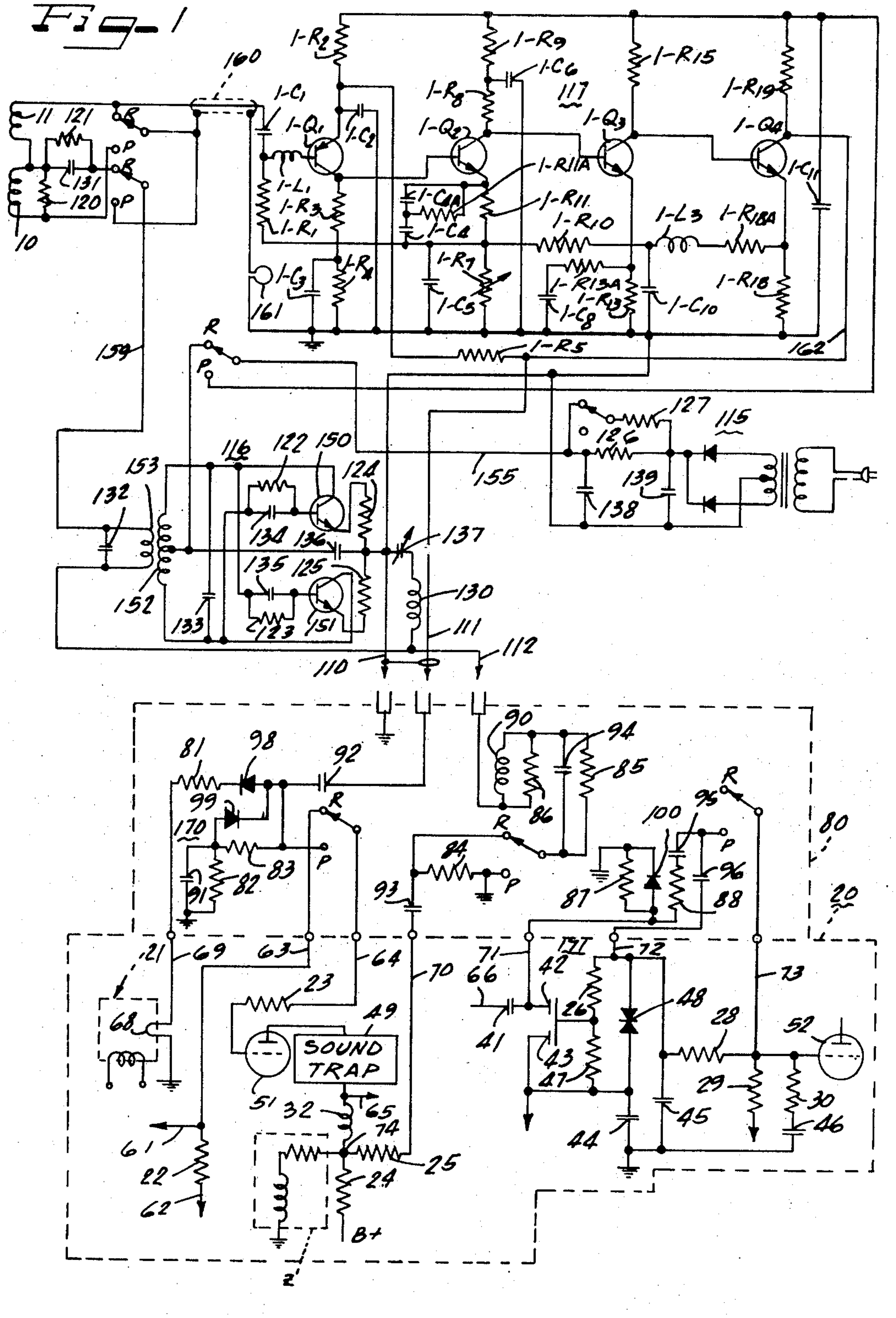
FIG. 1 is an electric circuit diagram showing a television recording and playback system in accordance with the present invention.

Referring to FIG. 1 there is illustrated recording and playback electric circuitry which is specifically adapted to record and playback monochrome video signals when used in conjunction with a conventional television broadcast receiver.

The various switch contacts are shown in the recording position which they would assume in carrying out a recording operation on a magnetic record tape. The magnetic transducer head assembly is diagrammatically indicated as including a first winding 10 having a relatively large number of turns and a second winding 11 having a lesser number of turns. The head assembly preferably is constructed as disclosed in my copending application U.S. Ser. No. 628,682 filed Apr. 5, 1967, now U.S. Pat. No. 3,534,177 issued Oct. 13, 1970. In the preferred construction, the magnetic head comprises a ring type core with the first winding 10 encircling a base portion of the core, and the second winding 11 wound on top of the winding 10 and thus being more closely coupled with the signal flux from the record medium at the coupling gap of the magnetic head, and particularly at relatively high signal frequencies where flux in the magnetic core is opposed by eddy currents. Winding 11 is placed such that there is relatively a minimum of leakage in its coupling with the signal flux from the magnetic record medium at the coupling gap, and which leakage is substantially less than that with respect to the winding 10.

In FIG. 1, a broadcast television receiver is indicated by dash line rectangle 20 and includes a horizontal output transformer 21, resistors 22–30, inductor 32, capacitors 41–46, diode pair 48, sound trap 49 and tubes 51 and 52.

As an example, the circuit components may be arranged in a circuit similar to that of the Zenith commercial broadcast television receiver chassis No. 14L30. Having reference to this specific receiver (and referring to certain commercial parts by the use of the manufacturer's notation placed in parenthesis), conductor 61 would be connected to the intermediate frequency second detector component (T4) of the 14L30 chassis and to video peaking circuit parts such as (L5) and (R5), while conductor 62 would lead to parts such as (C33) and (V8) of the sync separator circuitry of the chassis. The normal connection between conductor 61 and the left side of resistor 23 is broken, and conductors 63 and 64 are connected with the now separated circuit points. The tube 51 is identified in the chassis as (V6A) and is a type 6GN8 tube section providing the video frequency amplifier stage of the receiver. The sound trap 49 is identified as component (T5) in said chassis, and circuit point 65 may lead through conventional circuitry to the cathode, for example, of a picture tube (V15) of said chassis identified as type 19CRP4. Conductor 66 in FIG. 1 may be connected with the plate (pin 8) of tube (V8) of the chassis which is a type 6HS8 tube performing the functions of automatic gain control and sync clipping. The tube 52 is identified as (V10A) in said chassis and is formed by one half of a type 6KD8 tube. The horizontal output transformer 21 is shown as being provided with a single turn winding 68 connecting with a conductor 69 such that negative pulses are supplied by 69 during horizontal blanking. The output of the video amplifier tube 51 is supplied to a conductor 70, and connections are made to the horizontal control circuitry 171 associated with tube 52 as indicated by conductors 71, 72 and 73. Preferred values of various components are tabulated below by way of example and not by way of limitation with components which have been added to the commercial receiver circuit and components whose value has been changed suitably indicated.

Table I (FIG. 1)

| Resistor | Resistance Value (Ohms) |
|---|---|
| 22 | 68,000 |
| 23 | 330 |
| 24* | 7,500 |
| 25* | 3,300 |
| 26 | 330,000 |
| 27 | 330,000 |
| 28 | 1,000,000 |
| 29 | 150,000 |
| 30* | 100,000 |
| Inductor | Inductance Value |
| 32* | 100 microhenries to 316 microhenries |
| Capacitor | Capacitance Value |
| 41* | 100 micromicrofarads |
| 42 | 51 micromicrofarads |
| 43 | 51 micromicrofarads |
| 44** | 390 micromicrofarads |
| 45** | 390 micromicrofarads |
| 46 | 470 micromicrofarads |

* new component added to 14L30 Chassis
 value of component changed from that of the 14L30 Chassis With respect to the receiver 20 of FIG. 1, the conventional chassis No. 14L30 had a resistor (R8) at the location of inductor 32 and had an inductor (L7) at the location of resistor 24. The former components (R8) and (L7) are replaced by the components 32 and 24 in the system shown in FIG. 1. The resistor 25 is placed physically near takeoff point 74, from which the video signal is derived for recording, the takeoff point 74 being located between inductor 32 and resistor 24. Thus resistor 25 is physically substantially nearer to circuit point 65 at the output of the video amplifier of the conventional chassis than to the adapter circuitry located in a separate junction box 80 and to which conductor 70 connects. The resistor 25 reduces the loading effect of the record head circuitry connected with conductor 70** on the conventional video circuits, so that a good picture may be observed on the receiver picture tube (V15) while a recording operation is taking place.

The conductors 63, 64 and 69–73 are connected with components of a junction box indicated by the dash line rectangle 80, and the junction box 80 is preferably mounted on the television receiver 20. The junction box 80 contains resistors 81–88, inductor 90, capacitors 91–96 and diodes 98–100.

The preferred values for these components are tabulated below:

Table II (FIG. 1)

| Resistor | Resistance Value (ohms) |
|---|---|
| 81 | 22,000 |
| 82 | 470,000 |
| 83 | 680,000 |

Table II (FIG. 1)-Continued

| Resistor | Resistance Value (ohms) |
|---|---|
| 84 | 470,000 |
| 85 | 10,000 |
| 86 | 3,300 |
| 87 | 56,000 |
| 88 | 1,000,000 |
| Inductor | Inductance Value |
| 90 | 100 microhenries |
| Capacitor | Capacitance Value |
| 91 | 0.1 microfarad |
| 92 | .002 microfarad |
| 93 | .47 microfarad |
| 94 | 390 micromicrofarads |
| 95 | 100 micromicrofarads |
| 96 | 200 micromicrofarads |

Diodes 98, 99 and 100 — Type IN463A

The circuitry of the junction box 80 may be connected with conductors 110–112 in FIG. 1 by means of a plug and socket connection, the socket member being secured to the junction box 80, and a suitable plug being associated with a cable carrying conductors 110–112. The connections that lead from the TV set components to the junction box 80 preferably terminate in a plug and socket at 69, 63, 64, 70, 71, 72, 73. Thus TV sets may be provided inexpensively with a few connections and a socket; and the junction box added only if used with a recording or playback system. Connections such as 64, 70, etc., may be made to adaptors which fit under the tubes of the TV set. The circuitry at the upper part of FIG. 1 may be disposed closely adjacent to the video tape recorder including the recording head previously referred to having windings 10 and 11. These circuit components may include a direct current power supply component generally designated by the reference numeral 115, a bias frequency oscillator component generally designated by the reference numeral 116, and a playback preamplifier component 117.

The various circuit elements in the upper part of FIG. 1 have been given reference numerals between 120 and 161, or combined letter and number reference characters such as 1–R1 (where the initial number refers to the figure number in which the circuit element is located), and the preferred parameters are summarized below:

Table III (FIG. 1)

| Resistor | Resistance Value (ohms) |
|---|---|
| 120 | 1,800 |
| 121 | 4,700 |
| 122 | 27,000 |
| 123 | 27,000 |
| 124 | 2.7 |
| 125 | 2.7 |
| 126 | 100 |
| 127 | 10 |
| 1-R1 | 2,200,000 |
| 1-R2 | 120,000 |
| 1-R3 | 2,200 |
| 1-R4 | 18,000 |
| 1-R5 | 1,000,000 |
| 1-R7 | 560 |
| 1R8 | 470 |
| 1-R9 | 10,000 |
| 1-R10 | 2,700 |
| 1-R11 | 150 |
| 1-R11A | 150 |
| 1-R13 | 120 |
| 1-R13A | 22 |
| 1-R15 | 680 |
| 1-R18 | 220 |
| 1-R18A | 22 |
| 1-R19 | 470 |

Table III (FIG. 1)-Continued

| Resistor | | Resistance Value (ohms) | |
|---|---|---|---|
| Inductor | | Inductance Value | |
| 1-L1 | | 10 | microhenries |
| 1-L3 | | 5.5 | microhenries |
| 130 | | 24 | microhenries |
| Capacitor | | Capacitance Value | |
| 131 | | 300 | micromicrofarads |
| 132 | | 100 | micromicrofarads |
| 133 | | 820 | micromicrofarads |
| 134 | | 50 | micromicrofarads |
| 135 | | 50 | micromicrofarads |
| 136 | | .05 | microfarad |
| 137 | | 8 | micromicrofarads to 80 micromicrofarads |
| 138 | | 1,000 | microfarads |
| 139 | | 1,000 | microfarads |
| 1-C1 | | 20 | microfarads |
| 1-C2 | | 20 | microfarads |
| 1-C3 | | .01 | microfarad |
| 1-C4 | | .07 | microfarad |
| 1-C4A | | .003 | microfarad |
| 1-C5 | | 20 | microfarads |
| 1-C6 | | .01 | microfarad |
| 1-C8 | | .01 | microfarad |
| 1-C10 | | .005 | microfarad |
| 1-C11 | | .47 | microfarad |
| Transistor | 1-Q1 | Type 2N4250 | |
| | 1-Q2 | 2N3860 | |
| | 1-Q3 | 2N3860 | |
| | 1-Q4 | 2N3860 | |
| | 150 | 40407 | |
| | 151 | 40407 | |

Diodes1N463A

Transformer primary 152 — 14 turns No. 18
A.W.G. center tapped, ½ inch diameter by 1 inch long
Secondary 153 — 24 turns
No. 30 A.W.G. coupled to primary winding
Hum balancing loop 161 — 1 inch diameter loop with one or more turns depending on location with respect to hum fields
Head Parameters:
Winding 10 has 450 turns of number 48 A.W.G. with an inductance
of 4,800 microhenries.
Winding 11 has 150 turns of number 44 A.W.G. with an inductance
of 670 microhenries.
The head gap is about 25 microinches long.
Conections are series aiding for windings 10 and 11 during
playback.
Recording current is about 1 to 2 milliamperes peak to peak for the signal, and about 25 to 50 milliamperes bias
current peak to peak at 4.7 megacycles per second.
Tape speed is 120, 60, or 30 inches per second.
A tape with an extra smooth surface, either of audio or of
instrumentation grade is preferred.

The output of the power supply component 115 at conductor 155 may have a direct current potential of 20 volts. The operating frequency of oscillator 116 may be in the neighborhood of 5 megacycles per second.

During recording, the switch contact arms are in the upper positions as indicated in FIG. 1 and designated by the letter "R." During playback, the switch contact arms are in the lower playback position marked by the letter "P." In recording mode, the video signal including the horizontal synchronizing component and the vertical blanking component, that is a conventional composite monochrome signal, may be supplied via conductors 61, 63 and 64 to the grid of tube 51. The output of tube 51 is supplied through resistor 25, conductor 70, conductor 112, secondary 153 (with capacitor 132 in parallel) and conductor 159 to the head winding 11, the upper end of which is grounded through shielding 160 and hum balancing loop 161. The high frequency bias signal is supplied to the primary 152 by oscillator 116 and is superimposed on the video signal at the secondary winding 153.

During playback operation, with the switch contacts in the lower position, head windings 10 and 11 are connected in series aiding relation to the input of the preamplifier 117. With a series aiding connection, the low frequency components of the recorded signal produce voltages in windings 10 and 11 which are additive with respect to the input of preamplifier 117. The output of the amplifier 117 is supplied via conductor 162 and conductor 111 to the grid circuit of tube 51 for amplification and display on a conventional television receiver display tube.

The resistor 120 is connected across head winding 10 to suppress undesirable "ringing" or resonance peaks which may occur in the head circuit, and to reduce internal impedance of the head circuit.

Connected with conductor 64 during playback operation is a clamping network 170 including diodes 98, 99 and resistor 81 which are connected to winding 68 on the horizontal output transformer 21.

The horizontal stabilizing circuitry 171 at the input of the tube 52 in FIG. 1 receives the reproduced horizontal sync component from the magnetic record medium so as to control the sweep rate of the horizontal sweep signal for the deflection system of the television receiver cathode ray tube. Horizontal synchronizing pulses from a sync pulse separator of the television receiver are applied to line 66 in FIG. 1.

The description of clamping and stabilizing circuits in Ser. No. 401,832 (corresponding to the circuits 170 and 171) has been continued in my application Ser. No. 848,992 filed Aug. 11, 1969 (now abandoned) and in my copending applications Ser. No. 199,977 filed Nov. 18, 1971 and Ser. No. 200,793 filed Nov. 22, 1971, while a different portion of the disclosure of Ser. No. 401,832 is found in the issued patent thereon, U.S. Pat. No. 3,495,046 dated Feb. 10, 1970. These are especially valuable in handling video signals having imperfections arising in the record-reproduce process.

Figure 2:
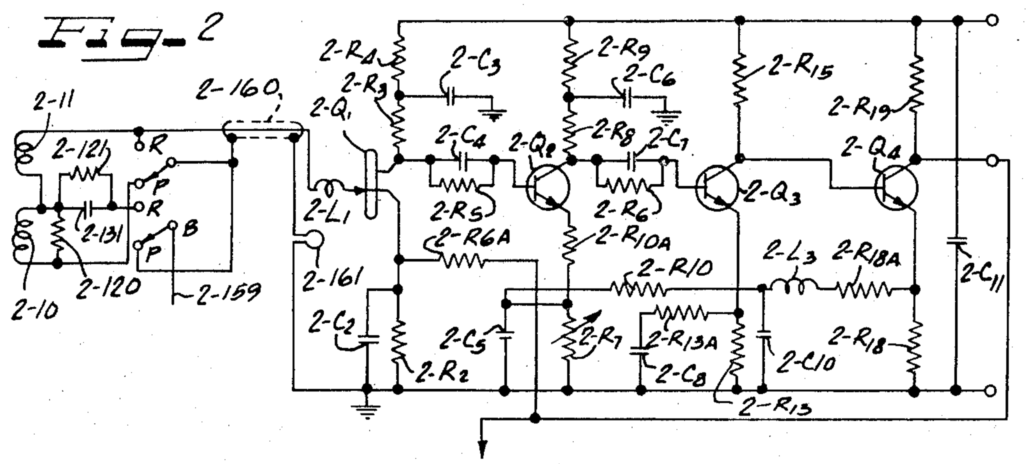
FIG. 2 is an electric circuit diagram showing a modified magnetic playback amplifier in accordance with the present invention.

FIG. 2 shows a modified input stage for the playback circuit of FIG. 1. Other portions of the recording and playback system of FIG. 2 correspond to those of FIG. 1, and the showing in FIG. 1 and the description of FIG. 1 is hereby specifically incorporated as disclosing the system of FIG. 2, except for the modifications. The following table summarizes the preferred parameters for the components actually illustrated in FIG. 2 (other preferred values being as found in Tables I, II and III):

Table IV (FIG. 2)

| Resistor | Resistance Value (ohms) |
|---|---|
| 2-120 | 3,300 |
| 2-121 | 4,700 |
| 2-R2 | 390 |
| 2-R3 | 330 |
| 2-R4 | 1,500 |
| 2-R5 | 200,000 |

Table IV (FIG. 2)-Continued

| Resistor | Resistance Value (ohms) |
|---|---|
| 2-R6 | 10,000 |
| 2-R6A | 100,000 |
| 2-R7 | 100 |
| 2-R8 | 220 |
| 2-R9 | 2,200 |
| 2-R10 | 1,500 |
| 2-R10A | 10 |
| 2-R13 | 82 |
| 2-R13A | 22 |
| 2-R15 | 820 |
| 2-R18A | 5.6 |
| 2-R18 | 180 |
| 2-R19 | 470 |
| Inductor | Inductance Value |
| 2-L3 | 5.5 microhenries |
| Capacitor | Capacitance Value |
| 2-131 | 200 micromicrofarads |
| 2-C2 | 25 microfarads |
| 2-C3 | .02 microfarad |
| 2-C4 | 20 microfarads |
| 2-C5 | 50 microfarads |
| 2-C6 | .1 microfarad |
| 2-C7 | 25 microfarads |
| 2-C8 | .005 microfarad |
| 2-C10 | .003 microfarad |
| 2-C11 | .47 microfarad |

Field effect transistor 2-Q1 — 2N4222A
Transistor 2-Q2 — Type 2N3856A
2-Q3 — Type 2N3856A
2-Q4 — Type 2N3856A
Hum balancing loop 2-161 — one inch diameter loop The other may correspond to that given in Table II beginning with the data under "Head Parameters" and continuing to the end of Table II.

The circuit of FIG. 2 has a higher input impedance than that of FIG. 1. Its low input capacitance reduces the head loading at high frequencies, while its low noise level at low frequencies improves the signal to noise ratio.

Figures 3, 4, 5:
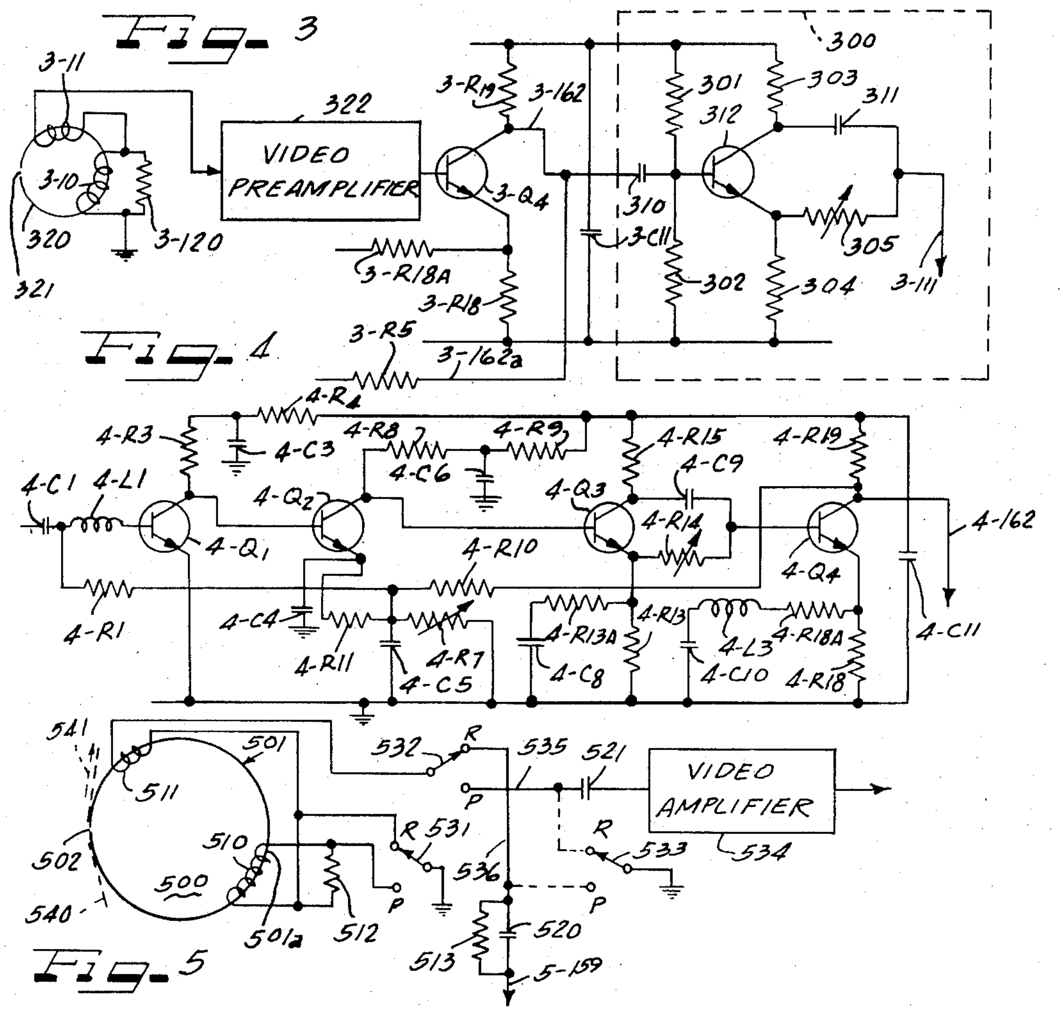
FIG. 3 is an electric circuit diagram illustrating a further modified magnetic playback system in accordance with the present invention.
FIG. 4 shows an electric circuit diagram illustrating a further magnetic playback amplifier in accordance with the present invention.
FIG. 5 shows an electric circuit diagram for a magnetic recording and playback system which may include the amplifier of FIG. 4.

In FIG. 3, the overall system corresponds to that of FIG. 1 but is modified by disconnecting output line 111 of FIG. 1 from line 162 and interposing a phase correction stage generally designated by the reference numeral 300. Thus line 3-162 in FIG. 3 which corresponds to line 162 in FIG. 1 is connected with the input of the phase correction stage (and also to feedback line 3-162*a*), and line 3-111 in FIG. 3 which corresponds to line 111 in FIG. 1 connects the output of the phase correction stage with capacitor 92 in the junction box 80.

The head parts in FIG. 3 may correspond to those in FIG. 1 and include a core 320 having a coupling gap 321 and windings 3-10 and 3-11. Resistor 3-120 corresponds to resistor 120 in FIG. 1. The switch circuitry and recording circuitry not shown in FIG. 3 may correspond to that in FIG. 1. Component 322 in FIG. 3 may represent the corresponding parts 1-C1, 1-L1, 1-Q1, 160, 161, 1-R1, etc., up to the input of 1-Q4 in FIG. 1.

The preferred values of the parts actually shown in FIG. 3 are tabulated as follows.

Table V (FIG. 3)

| Resistor | Resistance (ohms) |
|---|---|
| 3-R5 | 1,000,000 |
| 3-R18 | 220 |
| 3-R18A | 22 |
| 3-R19 | 470 |
| 301 | 22,000 |
| 302 | 10,000 |
| 303 | 220 |
| 304 | 220 |
| 305 | 0 to 5000 |
| Capacitor | |
| 310 | 20 microfarads |
| 311 | .0012 microfarad |
| Transistor | |
| 3-Q4 | Type 2N3860 |
| 312 | Type 2N3856A |

The other data may correspond to that given at the end of Table II beginning with the heading "Head Parameters" and continuing to the end of Table II.

In FIG. 4, the system of FIG. 1 is contemplated except for the introduction of a phase correction stage 400 in association with a transistor 4-Q3, corresponding to transistor 1-Q3 in FIG. 1. Thus the preceding stage associated with transistor 1-Q2 is connected with stage 400 in the same way as it is connected with the 1-Q3 stage in FIG. 1. Resistor 4-R10 in FIG. 4 is connected to the previous stages in the same way as resistor 1-R10 in FIG. 1. Conductor 4-162 in FIG. 4 connects with capacitor 92 just as shown for conductor 162 in FIG. 1, while resistor 1-R5 and the associated conductor leading to the emitter of 1-Q1 are omitted for the system of FIG. 4. The low frequency output of the FIG. 4 amplifier is reversed compared to that of FIG. 1, which may be counteracted by head switching as in FIG. 5 in place of the switching shown in FIG. 1.

The following table gives preferred values for the components illustrated in FIG. 4.

Table VI (FIG. 4)

| Resistor | Resistance (ohms) |
|---|---|
| 4-R1 | 150,000 |
| 4-R3 | 1,500 |
| 4-R4 | 120,000 |
| 4-R7 | 390 (adjustable) |
| 4-R8 | 820 |
| 4-R9 | 10,000 |
| 4-R10 | 4,700 |
| 4-R11 | 220 |
| 4-R13 | 120 |
| 4-R13A | 33 |
| 4-R14 | 0 to 5,000 |
| 4-R15 | 680 |
| 4-18 | 50 |
| 4-18A | 22 |
| 4-R19 | 470 |
| Inductor | Inductance Value |
| 4-L1 | 10 microhenries |
| 4-L3 | 5.5 microhenries |
| Capacitor | Capacitance Value |
| 4-C1 | 20 microfarads |
| 4-C3 | .01 microfarad |
| 4-C4 | .22 do. |
| 4-C5 | 20 microfarads |
| 4-C6 | .2 microfarad |
| 4-C8 | 2200 micromicrofarads (.0022 microfarad) |
| 4-C9 | 300 micromicrofarads |
| 4-C10 | 1500 do. (.0015 microfarad) |
| 4-C11 | .47 microfarad |

Transistor 4-Q1 — Type 2N3563
4-Q2 — Type 2N3860
4-Q3 — Type 2N3860
4-Q4 — Type 2N3860

The data for the head parameters in the system of FIG. 4 may be the same as given in Table II.

In FIG. 5, magnetic head 500 is shown as comprising a magnetic core 501 having a front coupling gap 502. The magnetic head may have the structure described in my copending application Ser. No. 628,682 filed Apr. 5, 1967, (now U.S. Pat. No. 3,534,177) and may include a first winding 510 having a relatively large number of turns encircling the core 501 in the region of gap 503 and may have a second winding 511 with fewer turns and in closer proximity to the coupling gap 502; for example, the winding 511 may be in closer proximity to the coupling gap by having at least a portion of most of the turns thereof closer to the coupling gap than any of the turns of winding 510. Thus, the closer proximity may be achieved by winding 511 being wound on top of the winding 510 where winding 510 encircles the base portion 501*a* of the core 501. The windings 510 and 511 may be arranged for connection in series aiding relation with respect to frequency components below the resonance frequency of winding 510 during playback operation when FIG. 5 switching is used with the amplifier of FIG. 4; or 510 and 511 may be connected in series opposition when FIG. 5 switching is used with the amplifier of FIG. 1. Switch contacts 531–533 are shown in their upper record positions in which positions a recording signal supplied to conductor 5-159 correspoding to conductor 159 in FIG. 1 is supplied to one side of winding 511 while the other side is grounded. During playback mode, the input to video preamplifier 534 is connected with windings 510 and 511 with the same polarities as in FIG. 1. Thus, the arrangement of FIG. 5 provides for the inverting of the video signal during recording relative to the playback polarities, in comparison with the arrangement of FIG. 1. The switch contact 533 is optionally arranged to ground the input line 535 leading to amplifier 534 during recording and to ground the recording signal line 536 during playback.

When the circuit of FIG. 5 is applied to the system of FIG. 4, the windings 510 and 511 are in series aiding relation during playback operation, capacitor 521 may correspond to capacitor 4-C1 in FIG. 4 and the components of amplifier 534 may correspond to the components between 4-C1 and 4-162 in FIG. 4. Components corresponding to 160 and 161 in FIG. 1 may also be used for this circuit.

In general, the switching of FIG. 5 may be used with any recording and playback system where otherwise a phase reversal would occur as between the recording signal supplied to the system and the reproduced signal delivered by the system, with reference to the polarities of FIG. 1. In any given system either the switching of FIG. 1 or the switching of FIG. 5 will be appropriate.

Figure 6A:
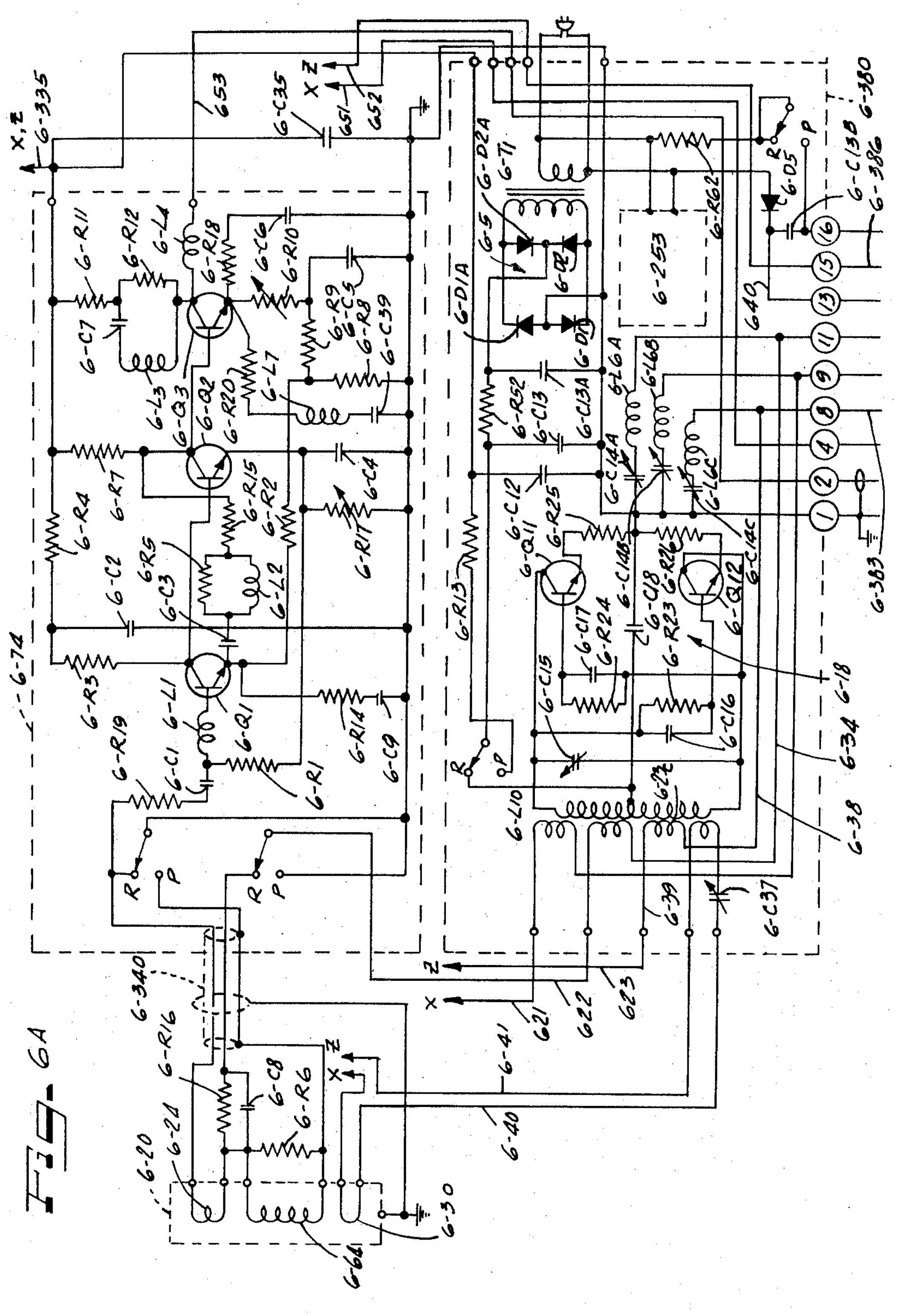
FIGS. 6A and 6B together show an electric circuit diagram for a magnetic recording and playback system for color television signals in accordance with the present invention, the circuitry of FIG. 6B being located below the circuitry of FIG. 6A as illustrated.
Figure 6B:
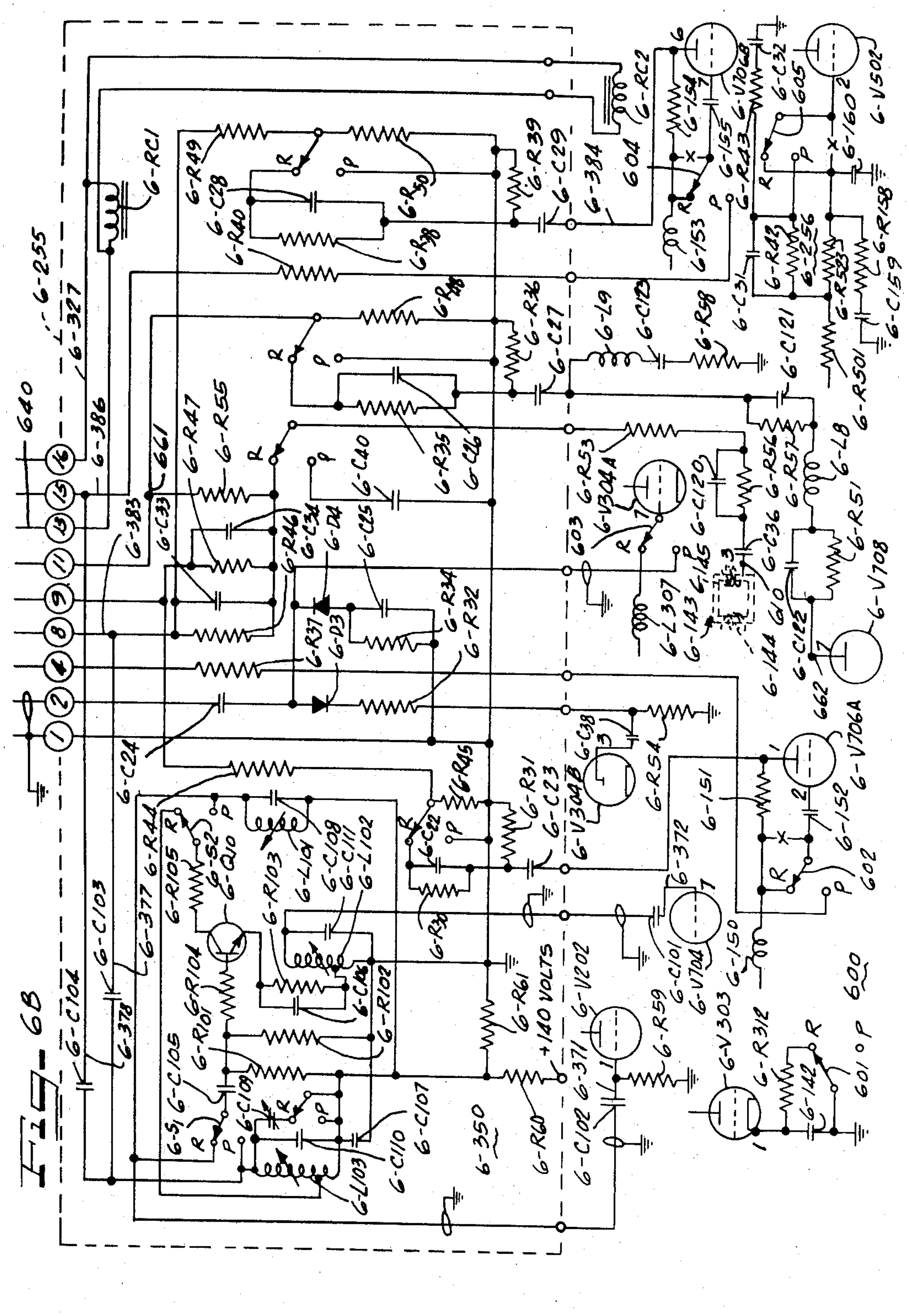

Referring to FIG. 6B, the lower part of the drawing may represent a conventional color television receiver 600. More specifically, the receiver 600 may comprise an RCA Model CTC16XH color television chassis with certain modifications as hereafter described. Except as specified, the circuit shown in FIG. 6B corresponds to the Model CTC16XH chassis.

The conventional components shown in FIG. 6B have been generally given reference characters similar to those given in part *b* of the fourth figure of my copending application Ser. No. 528,934 filed Feb. 21, 1966, now abandoned, the disclosure being continued in a streamlined continuation application Ser. No. 62,601 filed Aug. 10, 1970, but prefaced by the number six (representing the sixth figure of the present application). The conventional components of receiver 600 are tabulated in the following table.

Table VII

| Component | Chassis CTC16XH Designation | |
|---|---|---|
| 6-142 | C322 | |
| 6-R312 | R312 | |
| 6-V303 | V303 | 3rd Picture I-F |
| 6-V202 | V202 | Sound Demodulator |
| 6-V704 | V704 | "X" Demodulator |
| 6-150 | L705 | |
| 6-151 | R763 | |
| 6-152 | C731 | |
| 6-V706A | V706A | (R-Y) Amplifier |
| 6-V707B | V707B | Blanker |
| 6-L307 | L307 | |
| 6-V304A | V304A | 1st Video |
| 6-143 | T102 | High Voltage Transformer |
| 6-V706 | V708 | 3rd Video |
| 6-R501 | R501 | |
| 6-R523 | R523 | |
| 6-R158 | R522 | |
| 6-R159 | C517 | |
| 6-160 | C518 | |
| 6-V502 | V502 | Horizontal Oscillator |
| 6-153 | L704 | |
| 6-154 | R764 | |
| 6-155 | C726 | |
| 6-V706B | V706B | (B-Y) Amplifier |

Presently preferred values for the new components within the region of receiver 600 as well as for the other components in the system of FIGS. 6A and 6B are given in the following table.

Table VIII

| | |
|---|---|
| **Resistors:** [1] | |
| 6-R1=39K [2] | 6-R32=22K |
| 6-R2=150 [2] | 6-R34=180K |
| 6-R3=33K [2] | 6-R35=47K |
| 6-R4=22K [2] | 6-R36=470K |
| 6-R5=4700 | 6-R37=5600 |
| 6-R6=8200 [2] | 6-R38=47K |
| 6-R7=4700 [2] | 6-R39=470K |
| 6-R8=5.6 [2] | 6-R40=18K |
| 6-R9=150 [2] | 6-R42=47K |
| 6-R10=33 [2] | 6-R43=100K |
| 6-R11=470 [2] | 6-R44=5600 |
| 6-R12=470 [2] | 6-R45=10K |
| 6-R13=350 (one watt) | 6-R46=1.5M |
| 6-R14=22 [2] | 6-R47=1.5M |
| 6-R15=3300 [2] | 6-R48=10K |
| 6-R16=10K [2] | 6-R49=5600 |
| 6-R17=190 [2] | 6-R50=10K |
| 6-R18=33 [2] | 6-R51=4700 |
| 6-R19=560 [2] | 6-R52=10 |
| 6-R20=56 [2] | 6-R53=65K, 1 Watt |
| 6-R23=6800 | 6-R54=22K |
| 6-R24=6800 | 6-R55=2M |
| 6-R25=5.6 | 6-R56=39K, 1 Watt |
| 6-R26=5.6 | 6-R57=47K |
| 6-R30=47K | 6-R58=2700 |
| 6-R31=470K | 6-R59=5600 |

Table VIII – Continued

| | |
|---|---|
| 6-R60=27K, 1 Watt | 6-R102=15K |
| 6-R61=6200 | 6-R103=470 |
| 6-R62=470, 1 Watt | 6-R104=560 |
| 6-R101=560K | 6-R105=560 |

Capacitors

*Electrolytics:*

6-C1=25 microfarads 6 volts [2]
6-C2=15 microfarads 25 volts [2]
6-C4=60 microfarads 3 volts [2]
6-C5=250 microfarads 3 volts [2]
6-C12=500 microfarads 25 volts
6-C13=500 microfarads 50 volts
6-C13A=500 microfarads 50 volts
6-C13B=20 microfarads 150 volts

*Disc ceramic:*

6-C3=.005 [2] microfarad
6-C6=.005 [2] microfarad
6-C7=.05 [2] microfarad
6-C8=100 [2] micromicrofarad
6-C9=500 [2] micromicrofarad
6-C14A=mica trimmer 5-80 volts micromicrofarads
6-C14B=mica trimmer 5-80 volts micromicrofarads
6-C14C=mica trimmer 5-80 volts micromicrofarads
6-C15=.001 (mica) microfarad
6-C16=300 micromicrofarad
6-C17=300 micromicrofarads
6-C18=.05 microfarad
6-C22=200 micromicrofarads
6-C24=.002 microfarad
6-C25=.05 microfarad
6-C26=200 micromicrofarads
6-C28=200 micromicrofarads
6-C31=.01 microfarad
6-C32=.002 microfarad
6-C33=8.2 micromicrofarads
6-C34=8.2 micromicrofarads
6-C35=.05 [2] microfarad
6-C36=.001 (4KV) microfarad
6-C38=150 micromicrofarads
6-C39=.03 [2] microfarad
6-C40=15 micromicrofarads
6-C101=5 micromicrofarads
6-C102=5 micromicrofarads
6-C103=10 micromicrofarads
6-C104=10 micromicrofarads
6-C105=.02 microfarad
6-C106=.02 microfarad
6-C107=.05 microfarad
6-C108=50 mica micromicrofarads
6-C109=mica trimmer 9-180 micromicrofarads
6-C110=220 mica micromicrofarads
6-C111=120 mica micromicrofarads
6-C120=20 micromicrofarads
6-C121=500 micromicrofarads
6-C122=10 micromicrofarads
6-C123=500 micromicrofarads Paper (200 volts):

6-C23=.25 microfarad
6-C27=.25 microfarad
6-C29=.25 microfarad

Inductors (microhenries):

| | |
|---|---|
| 6-L1=10 [2] | 6-L7=240 [2] |
| 6-L2=240 [2] | 6-L8=550 |
| 6-L3=50 | 6-L9=550 |
| 6-L4=50 [2] | 6-L10=3 |
| 6-L6A=100 | 6-L101=7.1-12.5 |
| 6-L6B=100 | 6-L102=7.1-12.5 |
| 6-L6C=100 | 6-L103=51-102 |

Diodes:

| | |
|---|---|
| 6-D1=A13A2 | 6-D5=A13D2 |
| 6-D2=A13A2 | 6-D3=1N463A |
| 6-D1A=A13A2 | 6-D4=1N463A |
| 6-D2A=A13A2 | |

Transistors:

6-Q1 through 6-Q10=2N3856A
6Q11 and 6-Q12=7A30 (G.E.)

Switches:

8 pole double throw, Centrallab PA-1025 (in 6-74 and 6-380)
8 pole double throw, relay, Phillips 67DP R 8C3 (6-RC1)
8 pole double throw, relay, Allied T154-6C (6-RC2)

Power Transformer:

T1—Pri. 115 volts, Sec. 35V. 200 ma.

[1] The resistors are half-watt or one-quarter watt carbon resistors unless otherwise noted. Values are in ohms except when followed by a "K" which stands for kilohms, or when followed by an "M" which stands for megohms.
[2] Located in Y video channel including amplifier 6-74 of FIG. 6A.

Figures 7, 8, 9, 10, 11, 12, 13:
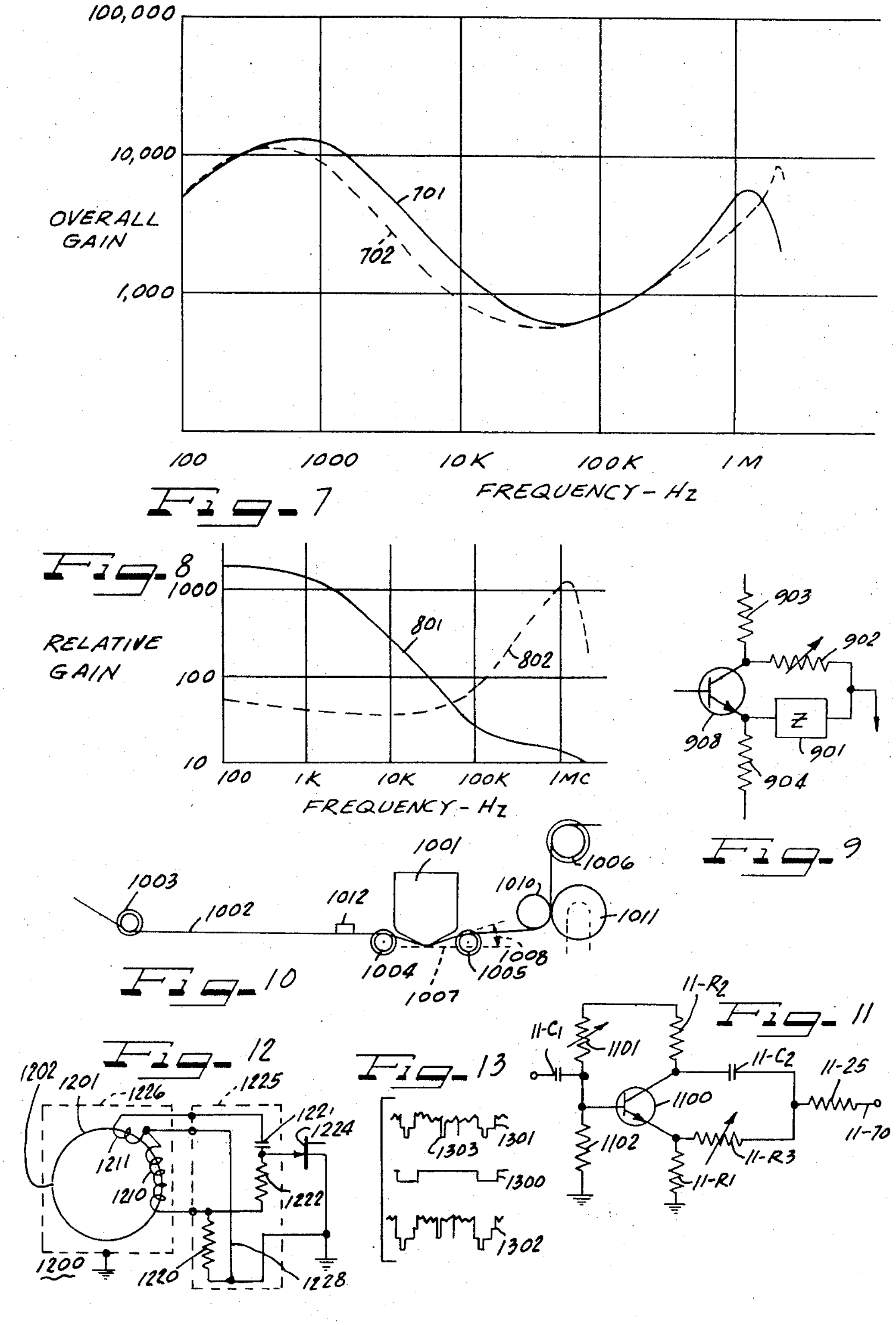
FIG. 7 shows graphically response curves as a function of frequency particularly with reference to the system of FIG. 1.
FIG. 8 illustrates further response curves utilized in explaining the operation of the video amplifier of FIG. 1.
FIG. 9 illustrates a modification of the output stage of the amplifier of FIG. 3.
FIG. 10 illustrates a preferred tape transport configuration for the previously illustrated system.
FIG. 11 is a circuit diagram illustrating a means for phase correction during recording operation.
FIG. 12 is an electric circuit diagram showing a phase correction circuit used directly at the head windings.
FIG. 13 shows diagrammatically television signal waveforms which are useful in explaining the operation of the circuit of FIGS. 6A and 6B.

Discussion of FIGS. 1, 7 and 8

FIG. 7 shows a curve 701 in solid outline representing the overall gain of the system of FIG. 1 as a function of frequency while curve 702 illustrates a similar response characteristic obtained with the following modifications of the system of FIG. 1: 1-R8 270 ohms, 1-R11 120 ohms, 1-R13A 6.8 ohms, 1-R18A 8.2 ohms, 1-R18 270 ohms, 1-R11A 50 ohms, 1-C3 0.017 microfarad, 1-C4 0.05 microfarad, 1-C8 0.005 microfarad, and 1-C10 0.0015 microfarad. The adjustments in the values of 1-R13A, 1-R18A, 1-C8 and 1-C10 affect high frequency response.

Curves 701 and 702 were taken by connecting a signal generator in series with the ground side of winding 10 of the playback head of FIG. 1 and by measuring the output at the collector of 1-Q4.

The direct coupled amplifier circuit of FIG. 1 is highly stable because of the direct current feedback path from the output stage 1-Q4 through 1-R18A, 1-L3 and 1-R10 to the second stage 1-Q2, and from the second stage through 1-R1 to the input of stage 1-Q1, and also from the collector of 1-Q4 through 1-R5 to the emitter of 1-Q1. The negative feedback circuitry is also effective at relatively low frequencies (below 1,000 cycles per second) to progressively reduce the response of the amplifier as a function of input frequency as frequency is decreased, reducing hum and fluctuations that would otherwise be annoying. The use of the NPN type transistor 1-Q1 for the first stage and the PNP type transistor for the following stage 1-Q2 improves the biasing condition by providing a low direct current voltage of only about 1.6 volts at the base of the second stage 1-Q2.

The first stage 1-Q1 operates at low collector current and voltage to give a high input impedance and low noise level. The input impedance may be adjusted for optimum loading of the head circuit by varying 1-R2. A reduction in the value of 1-R2 decreases the input impedance of the amplifier stage 1-Q1. The stage 1-Q1 has a response which rises as frequency decreases from approximately 8 kilocycles per second to approximately 1 kilocycle per second, and a substantially level response at high frequencies. This is desirable because the head output voltage is extremely low at low frequencies, while an attempt to boost the high frequencies at the first stage 1-Q1 would increase the input capacitance and lower the resonant frequency of the head circuit. The circuit constants for the first stage 1-Q1 shown in FIG. 1 and tabulated in Table III, supra give optimum operation with an equivalent source resistance of the order of about 2,000 ohms, which is optimum for the head used at the highest frequencies in the useful range. For example, the input stage 1-Q1 is "matched" to an equivalent head resistance of about 2,000 ohms (measured at frequencies above about 100 kilocycles per second) so as to give minimum noise. Thus, if the noise-figure of the first stage is measured as a function of resistance values connected across the input to the first stage, the minimum noise-figure will be observed for an input resistance of the order of 2,000 ohms. By utilizing a head providing an equivalent source resistance of the order of 2,000 ohms, optimum operation may be realized. In this sense, the input stage of the video amplifier 117 of FIG. 1 is "matched" for minimum noise to the effective source resistance of the playback head.

The second stage 1-Q2 has a rising response as frequency is decreased at frequencies between about 35 kilocycles per second and 1.5 kilocycles per second and which response as a function of frequency overlaps the rising response region exhibited by the first stage 1-Q1. Also the middle high frequencies, for example in the region of 15 kilocycles per second, are boosted by the network in the emitter of 1-Q2 including 1-C4, and the highest frequencies are boosted by capacitor 1-C4A.

The third stage 1-Q3 has a rising response as a function of input frequency as frequency is increased at the high frequency end of the amplifier range due to capacitor 1-C8 and resistor 1-R13A. For example, this third stage provides a rising response at frequencies between about 100 kilocycles per second and 2 megacycles per second or above.

The fourth stage 1-Q4 has a steep rise as frequency is increased at the high frequency end of the spectrum due to the resonance network 1-C10, 1-L3, 1-R18A; followed by a drop (due to 1-L3) in the response at frequencies above the useful range of the recording system. This steep rise is useful in compensating for the rapid drop in the output from the magnetic playback head at the highest frequencies. The fall off above this range in response as a function of frequency makes the amplifier more stable against oscillations and parasitics, and reduces the amplifier noise.

The amplifier 117 has been described in terms of bipolar transistors, but vacuum tubes may be substituted, the plate of a vacuum tube being analogous to the collector of a transistor, the grid analogous to the base, and the cathode analogous to the emitter. Similarly for field effect transistors where the drain, gate and source are analogous to the collector, base and emitter, respectively.

In FIG. 1, the successive amplifier stages 1-Q1 through 1-Q4 are direct coupled, the first stage comprising a PNP transistor 1-Q1 directly coupled from its collector to the base input of the NPN transistor 1-Q2. The first stage 1-Q1 has its collector operating at a voltage of the order of 1.6 volts. Thus there is a direct current coupling path between the collector of 1-Q1 and the base of 1-Q2, between the collector of 1-Q2 and the base of 1-Q3 and between the collector of 1-Q3 and the base of 1-Q4.

FIG. 8 illustrates by means of the curve 801 the relative gain of the first two stages of a video amplifier, similar to stages 1-Q1 and 1-Q2 in FIG. 1, as a function of input frequency. It will be observed that the gain exhibits a rising response as a function of frequency as frequency is decreased for relatively low frequencies below about 100 kilocycles per second. Curve 802 illustrates the gain as a function of input frequency for the last two amplifier stages of a video amplifier, similar to stages 1-Q3 and 1-Q4 in FIG. 1, and from which it will be observed that the last two stages exhibit a rising response as a function of frequency as frequency is increased at relatively higher frequencies in the range from about 100 kilocycles per second to about 1 megacycle per second. It will be noted that a curve generally as shown at 701 in FIG. 7 would be obtained by superimposing curves 801 and 802. Curves 801 and 802 are representative of the relative frequency response which would be obtained from stages 1-Q1 and 1-Q2, and from stages 1-Q3 and 1-Q4 in FIG. 1. The drop at frequencies below 1,000 cycles in FIG. 7 is due to the negative feedback.

Discussion of the Embodiment of FIG. 2

The field effect transistor 2-Q1 has an input stage with a higher input impedance and a lower noise level than the bi-polar stage of FIG. 1. The drain of 2-Q1 operates at a much higher voltage than the collector of 1-Q1. To compensate for this, a network 2-R5 and 2-C4 drops the voltage to the base of 2-Q2. A similar network 2-R6 and 2-C7 is used between 2-Q2 and 2-Q3. These allow the benefit of direct coupling and overall direct current and low frequency feedback (through 2-R10 and 2-R6A) while avoiding the need for a high voltage supply and excessive dissipation. The capacitors 2-C4 and 2-C7 allows a faster drop off in response as a function of frequency at extreme low frequencies, contributing to stability. Optionally, 2-R2 and 2-C2 and 2-R6A may be omitted, the source of 2-Q1 being connected directly to ground.

Discussion of the Embodiments of FIGS. 3 and 9

In correcting the frequency response of the tape and head in the short wavelength high frequency region a phase advance occurs in the region where effective tape thickness equals or exceeds half the recorded wavelength. For example at a tape velocity of 30 inches per second and an effective magnetic layer thickness of 0.2 mil (1 mil = 0.001 inch), the effect occurs for wavelengths 0.4 mil or shorter, and for frequencies equal or greater than: $f = v/\lambda = 30/\mathbf{0.0004} = 75{,}000$ cycles per second, where $f$ is the frequency, $v$ is the tape velocity and $\lambda$ is the recorded wavelength.

This phase advance may be corrected by the circuits of FIG. 3, FIG. 4, FIG. 11 or FIG. 12. Correction is also achieved by head windings oppositely connected in which case FIG. 1 or FIG. 2 are useful alone, or the additional correction of FIG. 3, FIG. 4, FIG. 11 or FIG. 12 may be applied. In FIG. 3 the low frequencies are passed by the emitter of transistor 312 through resistor 305 to the output 3-111 with no appreciable phase change as compared to the input at the base of transistor 312. Highest frequencies are passed by capacitor 311 and approach 180 degrees lagging phase with respect to the input at the base of transistor 312. At the frequency where the reactance of capacitor 311 equals the resistance of resistor 305 the phase shift is 90° lagging, and this is set in the mid range where correction is desired. Resistor 305 is shown adjustable so that setting may be varied. An PL circuit may be used in place of the RC circuit 305, 311. In this case a resistor such as 305 is substituted for capacitor 311 at the collector of transistor 312, and an inductor L is substituted for resistor 305 at the emitter, this arrangement being generically indicated in FIG. 9, the inductor L being located at 901 in FIG. 9 and having the same reactance as the former capacitor 311 had at the frequency of 90° phase shift. The elements at 305 and at 311 in FIG. 3 or at 901 and at 902 in FIG. 9 may be interchanged if a reversal in phase is desired. In all cases a lagging phase shift is obtained with increasing frequency.

Resistors 303 and 304 in FIG. 3 and at 903 and 904 in FIG. 9 need not be equal. In fact it is preferable that the resistor 303 or 903 be greater than the resistor 304 or 904 so that the stage give a net gain at high frequencies for FIG. 3, or at low frequencies if 305 and 311 are interchanged or for the arrangement of FIG. 9.

A peculiar and undesirable distortion has been found in the correction circuit of FIG. 3 due to charging of capacitor 311 through resistors 303 and 304 (as well as 305) when the transistor 312 becomes less conductive, as for example when a step function drives the base of 312 in a negative direction. This distortion is remedied by making the sum of the resistances of resistors 303 and 304 small compared to the resistance of resistor 305. While distortion is reduced when the sum of the resistances of resistors 303 and 304 is equal to the resistance of resistor 305, it is advantageous to make the sum less than half the resistance of resistor 305, and preferably about 0.1 the resistance of 305 or less. The resistor 305 and capacitor 311 may take a range of values as long as the product of the resistance and capacitance remains constant to give the desired frequency of 90° phase shift; however their impedance should be low compared to the load at 3-111 into which they operate, preferably 0.5 to 0.1 or less of the load impedance.

Low internal impedance of the source that is attached to the reactance element 901 in the phase correcting circuit of FIG. 9 is most important. Thus it is preferable that the reactance element, for example a capacitance, be connected in the emitter circuit of transistor 908, which emitter circuit has a lower internal impedance than the collector circuit, especially if a smaller resistor is used in the emitter circuit. The internal impedance of the driver stage for the phase correcting circuit of FIG. 9 can also be lowered by a feedback connection take from the collector and/or emitter, prior to the phase elements such as 901 and 902, the feedback being connected to a lower level stage of the amplifier. A push-pull emitter follower stage for dividing the phase circuit is another alternative; this can be of the complementary symmetry type.

An alternative to the phase correction methods described above is to operate the television record/reproduce system with a falling response of output as a function of frequency in the high frequency region where the effective thickness T of the magnetizable layer of the record tape is greater than $\lambda/2$. A drop of 2 to 6 decibels over octave was found to give excellent pictures, this being obtained with the system of FIG. 1 and for tape speeds of 30 to 60 inches per second. Even at a steeper falloff, good results were obtained. A combination of the phase correction method and the falling response method is recommended as the best compromise, where phase correction by circuitry is made in the wavelength region where tape thickness becomes greater than one-half the recorded wavelength of the high frequency picture components; and where the falling response is used in the highest frequency range corresponding to recorded wavelengths 0.2 to 0.1 as long as the $T = \lambda/2$ criterion. ($T = \lambda/10$ to $\lambda/20$). Such results are obtained with the circuits of FIG. 3, 4, 6A, 6B and 11 when operated at 30 to 120 inches per second with commercial tapes.

Discussion of the Embodiments of FIGS. 4 and 5

FIG. 4 shows the phase equalizer incorporated at the output of an intermediate stage 4-Q3 in a manner which gives "direct coupling" to the following stage at direct current and at low frequencies; and therefore allows overall feedback as previously described. The resistances of 4-R13 and 4-R15 in relation to the resistance of 4-R14, and the impedances of 4-R14 and 4-C9 in relation to each other and to the input impedance of 4-Q4 are preferably as explained previously in reference to FIG. 3. For example, 4-C9 may be 500 micromicrofarads and 4-R14 may be a potentiometer variable between 0 and 5,000 ohms and set at about 2,000 ohms depending on head-gap-tape-wavelength conditions.

Since 4-Q3 of FIG. 4 does not give a phase reversal at low frequencies, the switching of FIG. 5 should be used at its head circuit to provide a reversal. Thus, the circuit of FIG. 4 represents an embodiment of the video amplifier 534 of FIG. 5. The capacitor 4-C1 would replace capacitor 521 in this embodiment. Stage 4-Q3 gives a net gain at high frequencies, collector resistance 4-R15 having a higher value than emitter resistance 4-R13. As shown in FIG. 4, the emitter resistor 4-R13 of 4-Q3 feeding phase circuit 4-C9, 4-R14 is bypassed by capacitor 4-C8. Bypassing is complete when resistor 4-R13A is zero, or is partial if 4-R13A has appreciable resistance. The bypassing action takes place preferably in the neighborhood or above the $f_0$ region of 4-C9 and 4-R14 where the impedance of 4-C equals the resistance of 4-R14. Advantages are that extra gain is obtained so that a stage of amplification can be eliminated; also the phase correction can be modified in a desired manner.

Discussion of the Embodiment of FIGS. 6A, 6B and 13

FIG. 6 gives details of a color video recording playback system. Only the Y amplifier is shown, the X and Z amplifiers being connected with conductors 651 and 652 shown at the right of FIG. 6A and being associated with 621 and 623 at the left of FIG. 6A in the same way as illustrated for the Y amplifier 6-74 and conductors 653 and 622.

During recording specially shaped pulses are introduced into the head circuits. These are obtained from tap No. 3 indicated at 610 in FIG. 6B on the flyback transformer 6-143 through a network consisting of 6-C36, 6-C120, 6-R56 and 6-R53. The Y recording head circuit receives pulses through resistor 6-R55 which enhance the horizontal blanking pulse. The circuit shows supplies a relatively broad flat topped pulse of head current such as indicated at 1300 in FIG. 13. The pulses shown at 1300 resemble the blanking pulses, and make the horizontal circuits more immune to picture signals that overshoot into the sync region and which are rectified by the diode 6D3 at the playback output. Thus, if the picture signal from tube 6-V708 arriving at junction point 661 in FIG. 6B has a waveform as indicated at 1301 in FIG. 13, the resultant television recording signal supplied to conductor 6-34 in FIG. 6A will be generally as indicated at 1302 in FIG. 13. The pulses delivered through 6-R55 are about 8 to 10 microseconds wide, approximating or even exceeding the blanking interval, these pulses as indicated at 1300 being especially useful in overcoming sync timing distortion caused by excessive amplitude of picture information such as indicated at 1303 in FIG. 13 that reaches or exceeds the blanking level.

In the X and Z recording circuits the networks 6-R47, 6-C34 and 6-R46, 6-C33 give a more complex transient waveform of pulse current, which resembles very closely the pulses superimposed by the TV receiver 600 onto the color signals from 6-V706A and 6-V706B, but are of opposite polarity. The pulses from 6-R47, 6-C34 and 6-46, 6-C33 thus cancel the superposed TV receiver pulses. This preserves color balance, and prevents overload and modulation of sound signals.

In FIGS. 6B, the inductance 6-L8 reduces the relative high frequency loading at the takeoff point 662 where the receiver 600 is tapped for the Y recording head signal, and acts in a way similar to resistor 25 in FIG 1. The network consisting of 6-R51, 6-C122, 6-L8, 6-R57, 6-C121, 6-L9, 6-C123 and 6-R58 has been found particularly advantageous in securing a flat response without overloading. In FIG. 6A, the network 6-L7, 6-C39 and 6-R20 in the emitter of Q3 provides a broad peak in the frequency response centered in a mid-region of about 50 kilocycles per second, correcting for a deficiency of the head response in this region.

The inductance 6-L1 of low distributed capacitance is incorporated directly at the base of 6-Q1. This acts in conjunction with the relatively higher base capacitance to prevent pickup and rectification of radio frequency fields which are otherwise troublesome in this type of amplifier. The inductance 6-L1 and associated input wiring is sensitive to low frequency magnetic fields, for example motor hum. This is counteracted by a balancing loop such as shown at 161 in FIG. 1 located close to 6-L1, adjusted to balance out the low frequency pickup. Alternatively 6-L1 may be of two sections in hum bucking relation, or may be toroidally wound.

The same arrangement applies with respect to inductor 1-L1 and balancing loop 161 in FIG. 1.

Description of FIG. 10

FIG. 10 illustrates the tape path configuration which may be utilized with the previously described systems such as the system of FIG 1. The head assembly 1001 may be of the preferred construction previously referred to wherein the mounting blocks (35) and (36) of the head assembly of my copending application Ser. No. 628,682 filed Apr. 5, 1967 (U.S. Pat. No. 3,534,177) are formed of coin silver or sterling silver. The magnetic record tape 1002 travels along a path determined by fixed guides 1003–1006. If a plane is imagined such as indicated at 1007 extending parallel to the plane of the guides 1004 and 1005, it will be observed that the tape forms an angle of about 18° relative to the plane 1007 where the tape moves into contact with the head 1001 and where the tape leaves contact with the head. The angle referred to is indicated at 1008 in FIG. 10 by dash lines. The capstan 1010 for driving the tape 1002 past the head may be located on the shaft of a reversible motor and be arranged in relation to the capstan pressure roller 1011 as described with reference to the ninth figure of my copending application Ser. No. 528,934 (now abandoned). A wiper pad 1012 of felt or the like engages the active (oxide) side of the magnetic tape 1002 for the purposes described with reference to the damping pad (922) shown in the eighth figure of my copending application Ser. No. 401,832, found in the patent issuing on Ser. No. 401,832, namely U.S. Pat. No. 3,495,046 dated Feb. 10, 1970. In the illustrated embodiment, the wiper pad 1012 may be dry rather than impregnated with molybdenum disulfide and/or graphite. The tape tension preferably would not exceed 2.5 ounces for the particular system contemplated in FIG. 10 in order to minimize head wear. Higher tensions are feasible if increased head wear is acceptable. For the system of FIG. 1, there may be 10 channels across the width of the tape where the tape 1002 is ¼ inch wide. An alternative is a four channel system on a ¼ inch tape where the head pole pieces have twice the width. As described in the previous application, capstan 1010 is preferably effective to provide uniform motion in each direction of movement of the tape 1002 across head 1001 so that only a single capstan is required driven by a reversible constant speed motor.

Description of the Embodiment of FIG. 11

FIG. 11 shows a circuit for introducing phase correction during the recording process. A high voltage transistor 1100 which may be RCA type 40424 is preferably located at the adaptor box 80, FIG. 1 or in the television receiver 20 itself. By way of example, the input terminal in FIG. 11 may be connected to takeoff point 74 of FIG. 1 or to line 65. Resistor 11-25 in FIG. 11 may then correspond to resistor 25 in FIG. 1, and conductor 11-70 corresponding to conductor 70 in FIG. 1 leads via capacitor 93, components 85, 94 and 86, 90 and conductor 112 to the recording head. By way of example, capacitor 11-C1 may have a value of 0.5 microfarad, resistor 1101 may be adjustable and may be set to a value for example, to provide a collector current of transistor 1100 of about 40 milliamperes. Resistor 1102 may have a value of 500 kilohms, resistor 11-R1 may have a value of 1,600 ohms and resistor 11-R2 may have a value of 1,600 ohms. Resistor 11-R3 may be adjustable between 0 and 10 kilohms, while capacitor 11-C2 may have a value of 160 micromicrofarads. The transistor 1100 is provided with load resistance of relatively low value in both the emitter and the collector circuits, a resistor 11-R3 and a reactance 11-C2 being connected in series between the emitter and collector and having relatively high impedance in the operating frequency range compared to the load resistances. The output is taken from the junction of the series reistor 11-R3 and reactance 11-C2.

Description of the Embodiment of FIG. 12

FIG. 12 shows a phase correction circuit used directly at the head windings. The head may correspond to that described in connection with FIG. 5, the head 1200 comprising a core 1201 with a coupling gap 1202 across which a magnetic tape record medium moves as indicated by the dash line 540 and the arrow 541 in FIG. 5. The head is provided with windings 1210 and 1211 which may have different numbers of turns as described in connection with the other embodiments. The windings 1210 and 1211 may be in series aiding relation at low frequencies with the juncture between the two windings at ground potential as indicated in FIG. 12. By way of example, winding 1210 may have 450 turns and a resistance of 79 ohms, while winding 121 may have 150 turns and a resistance of 13 ohms. As a second example, windings 1210 and 1211 may have 150 turns and 50 turns, respectively with resistances of 11 ohms and 2.3 ohms. One or both of the windings may be damped, a damping resistor being indicated at 1220 across winding 1210 in FIG. 12. The circuit of FIG 12 has the advantage that the resistances of the head windings may be quite low. The windings are connected with a network comprising capacitor 1221 and resistor 1222, the output of which is connected to the input of a field effect transistor 1224. By feeding the output of the network 1221, 1222 into a field effect transistor 1224, the impedance of resistor 1222 may be relatively high in comparison to the total resistance of the windings 1210 and 1211 in series. Further, the capacitance of 1221 may be selected so as to provide a capacitance reactance equal to the impedance of resistor 1222 at a desired frequency within the operating frequency range of the transducer system including head 1200. The RC network shown within the dash rectangle 1225 may be replaced by other types of phase correcting circuits, as for example the parallel T, bridged T or lattice networks. Thus, if the upper terminal of winding 1211 is termed terminal 1, the lower terminal of winding 1210 is termed terminal 2, and the two right hand outputs of network 1225 are termed terminals No. 3 and No. 4, the upper input to the transistor 1224 being designated terminal No. 3, then a lattice network might be interposed between the windings 1210 and 1211 and the transistor 1224 by inserting impedances Z1 between terminals 1 and 3 and between terminals 2 and 4, and by connecting impedances $Z_2$ between terminals 1 and 4 and between terminals 2 and 3. An important advantage of incorporating the phase correction network 1225 directly at the head winding terminals (either for a recording head or for a playback head, or for a recording and playback head) is that neither head winding terminal 1 or 2 has to be grounded, and thus a lattice type network can be used. A lattice network is the most general and most flexible, but cannot have both its input and output sides grounded. With the arrangement as shown, the side of the lattice network remote from the head windings can have one terminal grounded (terminal No. 4) as is usual when operating into an amplifier, and the head winding terminals of No. 1 and 2 may be floating relative to ground potential. As an example of a lattice type network, the impedances Z1 can be capacitors of equal value between terminals No. 1 and 3 and between terminals 2 and 4, and the impedances Z2 can be resistors of equal value between terminals 1 and 4, and between terminals 2 and 3. The "cross-over frequency" is the frequency where the capacitive reactance equals the resistance. The head case indicated at 1226 is preferably grounded, but insulated from the windings 1210 and 1211. For a lattice type network the line 1228 extending from the juncture of windings 1210 and 1211 to ground would be omitted since the windings should not be grounded.

Where the network of FIG. 12 is used for recording and playback record-play switching can be provided at the side of network 1225 remote from the head windings.

General Discussion

Head windings may be connected in series aiding relation at low frequencies, and this will be the correct polarity when the windings are used in the systems of FIGS. 1, 2 and 3. Alternatively a single winding head may be used corresponding to the winding 11 of FIG. 1, with a shorting link replacing the winding 10 and resistor 120. In this case, a damping resistor may be added in parallel with the single winding corresponding to winding 11 in FIG. 1. The same single winding arrangement is useful in the system of FIG. 2 or FIG. 3. To use the system of FIG. 4 with a single winding in the same way, the head switching shown in FIG. 5 should be utilized (by replacing winding 510 and resistor 512 with a shorting link), this arrangement reversing the recorded polarity with respect to the playback polarity. If the head windings are used in series opposed polarity at low frequencies then the switching of FIG. 5 should be substituted in the systems of FIGS. 1, 2 or 3. This head connection gives high frequency phase correction. A series RLC network (resistance, inductance and capacitance in series) in an emitter circuit such as shown in the emitter circuit of transistor 6-Q3 in FIG. 6 may be required to correct a deficiency at mid frequencies of the order of 50 kilocycles per second to 500 kilocycles per second. The system of FIG. 4 may be used with the head winding switching arrangement of FIG. 1. The systems of FIGS. 3 and 4 give additional phase correction. In general, a single winding head may be used in the systems disclosed herein as utilizing series aiding winding connections.

The components shown herein as fixed in value may be made adjustable, for example capacitor 1221 in FIG. 12 or resistor 1222 may be adjustable if desired.

The sound recording and reproducing systems found in the previous applications referred to herein can be utilized in conjunction with any of the systems disclosed herein. The disclosures of each of the aforementioned copending applications relating to the recording and playback of audio signals are incorporated herein by reference in their entirety with respect to each of the systems as described herein.

In the system of FIG. 1, the bias oscillator 116 which operates during recording draws an approximately equal or a greater current from the power supply 115 in comparison with the current supplied to the playback amplifier 117 during playback operation, so that the power supply loading does not rise substantially in either the record or the play position of the record-play switch of FIG. 1. Thus the danger of damage to the filter capacitors 138 and 139 is avoided.

Having reference to the second paragraph at the forty-first page of my application Ser. No. 528,934, the resistor (R19) which is included in the X and Z amplifiers (75) and (76) would be located as indicated for the resistor 6-R19 in FIG. 6A of the Y amplifier shown herein.

The values of various components of the systems disclosed herein are given by way of example only and not by way of limitation.

Preferred Head Construction

The head of my copending application Ser. No. 628,682 filed Apr. 5, 1967 is particularly advantageous for recording of television signals, and it has been found that coin silver (90 percent silver, 10 percent copper) or sterling silver (92 percent silver, 8 percent copper) core mounts are advantageous, electrically because of high conductivity, and mechanically because of good wearing properties and freedom from contamination of the tape surfaces. This type of head is specifically disclosed herein as being used in each of the record and/or playback systems disclosed or referred to or incorporated herein.

The heads disclosed herein may be 20 mils wide, allowing ten tracks to be recorded on ¼ inch wide magnetic tape. A1 alternative would be a head width of 44 mils and four tracks on ¼ inch wide tape.

Another less expensive alloy for the core mounting blocks of Ser. No. 628,682 is an alloy containing approximately 1 percent silver and 99 percent copper.

The circuits and preferred values of components in the X and Z playback amplifiers for the system of FIGS. 6A and 6B may be the same as given for the Y amplifier 6-64 herein except as follows. In place of resistor 6-R10 of amplifier 6-74, the X and Z amplifier may each use a potentiometer adjustable between 0 and 50 ohms. Inductor 6-L3 is replaced by a conductor with essentially zero inductance in the X and Z amplifiers. While components corresponding to 6-R20, 6-L7 and 6-C39 are advantageous in the X and Z amplifiers, the requirements are less critical in these amplifiers, so that such components have been omitted in the system of FIG. 1, as referred to herein. Capacitor 6-R14 and capacitor 6-C9 have also been omitted in the X and Z amplifiers since highest frequency response is not so important.

In FIG. 6A, the network 6-R20, 6-L7 and 6-C39 in the emitter of Q3 provides a broad peak in the frequency response centered in a mid-region of about 50 kilocycles per second, correcting for a deficiency of the head response in this region.

The original circuit of receiver 600, FIG. 6B, has been broken in a number of points as will be apparent to those skilled in the art, for example at the locations indicated by a small "$x$" and the separated circuit points are selectively connectible by means of relay contacts such as indicated at 601–605 which are under the control of relay coil 6-RC2 of a six pole double throw relay. At other places in receiver 600 of FIG. 6B, tube elements, circuit components and conductive connections are not shown for the sake of simplicity since such elements remain unchanged from the standard circuit.

It may be noted that capacitor 6-C36 connects with a terminal 610 of horizontal output transformer 6-143 which is designated as terminal number 3 in the commercial chassis.

The components in the lower dash line rectangle 6-380 in FIG. 6A include preferred circuitry for the video bias component 6-18 as well as the bias frequency trapping networks 6-C14A, 6-L6A, 6-C14B, 6L6B, and 6-C14C, 6-L6C and a power supply circuit 6-5.

A tape transport control circuit is indicated by a dash rectangle 6-253 which may correspond to that shown in the seventeenth figure of my copending application Ser. No. 493,271 now U.S. Pat. No. 3,531,600 issued Sept. 29, 1970. In an actual embodiment of the present invention, however, supply and take-up reel motors are used with special torque rotors to provide drag on the supply spindle depending on the direction of tape travel, instead of the half wave rectifier and variable resistor which provide direct current drag in my previous disclosure.

The circuitry in the dash line rectangle 6-255 in FIG. 6B may be termed the adaptor or coupling circuitry and consists of a junction box that receives a cable from the recorder unit (represented by block 6-380 in FIG. 6A and contains circuitry that is best located adjacent the television receiver 600 to minimize undesirable capacitance or stray coupling, and to simplify the cable connections. In other words, the adaptor circuit 6-255 is physically disposed closely adjacent to the conventional video circuit components indicated at 600 in the lower part of FIG. 6B.

The adaptor circuitry 6-255, FIG. 6B, includes preferred circuit elements for the equalizing circuits 6-R35, 6-C26; 6-R30; 6-C22; and 6-R38, 6-C28. Also included is preferred circuitry for the clamp circuit which comprises components 6-C24, 6-R32, 6-D3, 6-D4, 6-R34 and 6-C25. A stabilizing circuit 6-256 is indicated at the lower right of FIG. 6B and is associated with the horizontal control circuit of the receiver circuitry including elements 6-R501, 6-R523, 6-R158, 6-C159 and 6-160, 6-C31, 6-R42 6-R43 and 6-L32.

The operation of the video head units such as indicated at 6-20 in FIG. 6A in relation to the other circuitry of FIG. 6A will be readily understood by a consideration of the disclosure of my copending application Ser. No. 493,271.

The overall function and operation of the circuitry of FIGS. 6A and 6B will in general be apparent from the foregoing description and from the disclosure of my aforementioned copending applications. Certain significant features of the illustrated circuitry will now be referred to in detail.

Referring to FIG. 6B, resistors 6-R37 and 6-R40 (of adaptor 6-255) in the circuit coupling the color playback preamplifiers to the R-Y and B-Y amplifiers in the TV receiver 600 set the clamping levels of the (R minus Y) and (B minus Y) amplifiers 6-V706A and 6-V706B, respectively, by loading the grid circuits and thus determining the grid currents that flow as a result of pulses in the cathode circuits of the amplifier tubes 6-V706A and 6-V706B. The pulses are fed from the plate of a tube V707B of the conventional chassis to the cathodes of tubes V706A and V706B. Resistors R37 and R40 may be adjustable with values of 5,600 and 18,000 ohms, respectively, having been found to give a white background when no color picture is present. Without these resistors the playback color balance is seriously upset.

During recording, negative pulses from terminal 3 of the winding indicated at 6-145 of the horizontal output transformer are fed to the recording head circuit 6-380 through components such as series capacitor 6-C36, series resistor 6-R53 and RC network 6-R56, 6-C120. These components shape the negative current pulses from the horizontal output transformer so that they effectively neutralize similar pulses from the output of the color amplifier tubes 6-V706A and 60V706B. If the latter pulses are not cancelled they will be recorded as part of the color signal, and upon playback these pulses will upset the operating levels of the color circuits, giving incorrect color rendition. Also the presence of these unnecessary pulses tends to limit the recording levels or to overload the magnetic record tape. Alternatively it is possible to counteract during playback the effects of the color signal pulses if these are not neutralized. This may be done by applying a corrective bias to the grid or plate circuit of tubes 6-V706A and 6-V706B or the grids of the picture tube. It is preferable, however, to record the color signals without their blanking-interval pulses, or with these greatly reduced, and this mode of operation has been illustrated in FIG. 6B.

Switch 601 is in series with cathode resistor 6-R312 of tube 6-V303 and renders this IF stage inoperative during playback to prevent feedthrough of broadcast signals from interferring with the tape playback operation.

Inductor 6-L8 in the receiver circuitry 600 of FIG. 6B reduces loading of the television signal circuits by the connection to the recording head circuit, reduces interference from the high frequency bias circuit, and serves to increase the amplitude of the high frequency components of head energizing current because of a series resonance effect with the video head circuit capacitance. Resistors 6-R44 and 6-R49 in the adaptor circuit 6-255 similarly serve in the (R minus Y) and (B minus Y) recording head circuits.

In FIG. 6A, power supply circuit 6-5 includes a bridge circuit giving an output voltage of 35 volts to the bias frequency oscillator circuit 6-18.

The three head units associated with the X, Y and Z playback amplifiers, respectively, and with conductors 621, 622 and 623 during recording, may correspond to those shown in the third and fifth through eighth figures of my copending application Ser. No. 528,934. The energization of the cross field windings such as 6-30, FIG. 6B, of the respective head units may be carried out as described in said copending application.

The circuitry of FIGS. 6A and 6B is converted from the recording mode illustrated to the playback mode by actuating the record-play selector relays associated with coils 6-RC1 and 6-RC2 to shift the associated contacts from the "R" to the "P" positions. In playback mode the two video windings of each video head unit such as windings 6-24 and 6-64 are connected in series with each other with the phases of the voltages induced therein (at low frequencies) either in phase or 180° out of phase. A series opposing relation has been disclosed and described in detail in my aforementioned copending application including Ser. No. 493,271. In this case, the overall circuitry is arranged to provide an improved response characteristic taking advantage of the fact that the high impedance windings such as 6-64 are resonant at a relatively lower frequency such as at about 50 kilocycles to about 250 kilocycles per second while the low-turns windings such as 6-24 are resonant at a much higher frequency such as at about 2 megacycles per second. The two video windings of each video head unit in series complement each other thereby extending the total frequency response. By way of example windings 6-24 and 6-64 may have 200 turns and 1,200 turns, respectively.

With the series opposing relationship between windings 6-24 and 6-64, during playback at low frequencies the output of winding 6-24 subtracts from the output of winding 6-64 reducing the output of winding 6-64 by perhaps 20 percent, which is not significant. At frequencies above resonance of the high turns winding 6-64, the output of this winding reverses in phase and aids the output of winding 6-24. At still higher frequencies above the resonance of winding 6-24, the output of winding 6-24 reverses phase and again is of opposite phase relative to the output of winding 6-64; however, at these frequencies the output of winding 6-64 is insignificant.

The phase shift in the playback amplifier such as 6-74 associated with the windings 6-24 and 6-64 is the reverse of that of the combined windings (as a function of frequency) so that an overall smooth phase characteristic (constant time delay) as a function of frequency results at the output of the amplifier 6-74, except at the very lowest and highest portions of the spectrum. Thus, the overall effect of the recording and playback system of FIGS. 6A and 6B is to produce at the output of the playback amplifiers color video signal components having essentially the same phase relationship as the original component signals supplied by the receiver 600 during recording. Further, the frequency components of each color component signal such as the signal supplied by playback amplifier 6-74 have the same phase relationships as the corresponding frequency components of the original signal.

The response of the playback amplifiers as a function of frequency is purposely made to drop rapidly at frequencies below about 300 to 600 cycles per second in order to reduce hum and low frequency transistor noise, giving important economies since it is not necessary to use elaborate shielding or expensive low-noise transistors in the playback amplifier circuitry. It has been found that boost in amplitude response as a function of frequency of perhaps 3 decibels to 10 decibels at frequencies above the low frequency cut-off, for example a boost in the frequency range from 600 cycles per second to 3,000 cycles per second, is beneficial in giving a smooth time delay characteristic at low frequencies, that is in giving a relatively constant time delay over the entire useful video range when this feature is used with the transducers and circuitry as described.

The pedestal setting or clamping circuit including capacitor 6-C24, resistor 6-R32, resistor 6-R34, capacitor 6-C25 and diodes 6-D3 and 6-D4 further removes hum components, sets the sync pulses at the correct level, and biases the video amplifier 6-V304A in the television set to the proper operating value.

It will be understood that during playback of a recorded video signal, the reproduced signal will be supplied to the grid of amplifier tube 6-V304A, and that the plate of the tube V304A is coupled to succeeding stages of video amplification via existing circuits. The color television receiver 600 of course includes an image reproducing device such as a tri-color television tube.

At the highest frequencies of the effective bandwidth of a record-playback system, the playback amplifiers provide adequate amplitude compensation in conjunction with the recording equalizer circuits, but phase compensation at these highest frequencies may not be exact. Such lack of exact phase compensation at the highest frequencies has been found to be very practical in an economical recorder, the result being a shift in fine structure of the image which is barely noticeable. If desired, satisfactory compensation at these highest frequencies of the order of 1 megacycle per second and higher can be accomplished by additional circuits such as shown in FIG. 3 or FIG. 4.

An overall response may be obtained in each video channel generally as indicated in the sixteenth figure of my copending application Ser. No. 493,271. The high frequency response of the X and Z playback amplifiers may be reduced by changes as indicated in the table of component values and elsewhere in this application. There the response was shown as extending to 2.2 megacycles per second at the high end from about 300 cycles per second at the low end. This may be termed the bandwidth of the amplifiers. However, the pedestal setting circuit effectively extends this to d-c (direct current). The normal recording level was approximately 35 to 40 decibels above the broad bend noise level. These characteristics are considered satisfactory for a low-cost, non-professional recording unit. The frequency response indicated in the sixteenth figure of the copending application results in a play-back picture image quality of acceptable level. It is found, however, that in the recording process a rising response or amplitude level of recording current as a function of the frequency with constant input to the video amplifier stage (6-V304A or 6-V708, 6-V706A and 6-V706B) in the region from 10,000 cycles per second to 100 kilocycles per second is beneficial, and this rising response characteristic is provided by the recording circuits 6-R48, 6-R35, 6-C26; 6-R45, 6-R30, 6-C22; and 6-C50, 6-R38, 6-C28 for the respective video channels in the illustrated embodiment. This rising response characteristic for the recording circuits is indicated by curve in the tenth figure of my application Ser. No. 528,934.

With the transducer head units of the type illustrated in the fifth through eighth figures of application Ser. No. 528,934, a normal operating level of signal current of about 1.0 milliamperes peak-to-peak in the 200 turn winding such as 6-24 is satisfactory. Saturation begins at about 4 to 8 milliamperes. A bias current of about 12 milliamperes may be superimposed on the signal current in the head unit 6-20, and bias currents of about 20 milliamperes may be superimposed on the signal currents in the other head units, where the bias frequency is about 2.8 megacycles per second. The exact frequency is adjusted by adjusting capacitor 6-C15 to prevent interference with the television set circuits. The values of bias current of 12 milliamperes and 20 milliamperes at a frequency of about 2.8 megacycles per second may be utilized in the absence of any bias current to the windings such as 6-30.

When the cross field windings such as 6-30 are energized, a current in the range from 1 to 5 amperes r.m.s. at the bias oscillator frequency may be employed and the bias currents to windings such as 6-24 may be reduced to about half the values given above, and a higher bias frequency may be used as for example 4.2 megacycles per second to 4.4 megacycles per second, or a bias frequency above 4.6 megacycles per second may be used.

If the cross field windings such as 6-30 are not used, a lower bias frequency is required and the overall response is not as good.

In the illustrated embodiment as in the embodiment of may copending application Ser. No. 493,271, the recording level may be of the order of 8 to 10 decibels below tape saturation. The playback amplifier 6-74 and the similar X and Z amplifiers are generally similar to the playback circuit shown in the eighteenth figure of my copending application Ser. No. 493,271. This circuit includes a negative feedback network between the collector of 6-Q2 and the emitter of 6-Q1 and serves to provide a phase shift compensating for the phase shift which occurs in the head response at and below the cross-over region centering about the resonant frequency of the high impedance winding of each head unit such as the high impedance winding 6-64 of the head unit 6-20.

Referring to the ninth figure of my copending application Ser. No. 401,832, the above mentioned negative feedback network which includes 6-R15, 6-R5, 6-L2 and 6-C3 and which extends between the first two stages of video amplification in FIG. 6A (together with 6-C9, 6-R14; 6-C6, 6-R18; 6-C39, 6-L7, 6-R20; and 6-L3, 6-R12, 6-C7) is designed to provide the phase correction in the curve designated 680 in the region designated by reference numeral 682. The phase shift as a function of frequency provided by the feedback network which includes resistor 6-R15, resistor 6-R5 and inductor 6-L2 in parallel, and capacitor 6-C3 together with the above mentioned networks compensates for the phase shift in head response in the region of resonance of the high impedance winding such as winding 6-64 for the head unit 6-20.

The maximum overall gain of the video amplifier circuit such as 6-74 varies between about 100 and 10,000 as a function of frequency. Actually the transistorized circuit shown herein and in the eighteenth figure of my copending application Ser. No. 493,271 gives greater high frequency response and higher gain than the vacuum tube circuit shown in the seventeenth figure of said copending application.

The difference in circuit constants as for example 6-R15, 6-L2, 6-C3 in FIG. 6A and in the corresponding circuit of Ser. No. 493,271 accounts for the deeper valley in response of the latter which drops to an amplification of only about 15 at 150KC to match a different head characteristic.

The high impedance windings such as 6-64 of the head units are loaded by resistors such as 6-R6 but are not connected during recording and become effective during playback, in the illustrated embodiment. These head windings such as 6-64 are shunted by resistors such as 6-R6 to flatten the resonance response characteristic of each high impedance winding at the resonance frequencies of this winding with respect to the associated circuit capacitance. The low impedance winding of each head unit, such as winding 6-24 of head unit 6-20, (together with the associated high impedance winding) is damped by the input resistance of the first transistor 6-Q1 which input resistance is comparable to the impedance of winding 6-24 at medium and high frequencies within the range of the system. The input impedance of transistor 6-Q1 is determined by the networks connected to its emitter and varies with frequency. The two conductor double-shielded cable generally designated by the reference numeral 6-340 connects the head unit 6-20 to the input circuits and prevents hum and extraneous signal pick-up by the two conductors and inner shield within the cable.

Inductance 6-L1 removes radio frequency pick-up of energy being broadcast from local transmitters which pick-up might otherwise overload the input circuits.

Unless otherwise indicated, each of the features described herein with respect to the head unit 6-20 and its associated video amplifier 6-74 applies also to the other head units and to the X and Z playback amplifier components.

The direct current operating points of the transistors 6-Q1, 6-Q2 and 6-Q3 are stabilized by negative feedback to the emitter of transistor 6-Q1 via the circuit leading to resistor 6-R2, and by feedback via the circuit to the base of transistor 6-Q1 through resistor 6-R1. The high degree of feedback makes the circuits insensitive to variations in transistor characteristics, supply voltage, temperature, etc. The capacitor 6-C5 bypasses the feedback network 6-R8, 6-R9 associated with the feedback circuit including 6-R2 allowing the amplifier to have normal gain at operating frequencies above about 300 to 800 cycles per second while substantially reducing the overall amplifier gain at frequencies below about 300 to 800 cycles per second relative to such normal gain and thus reducing hum and instability. In the circuit specifically disclosed herein, capacitor 6-C5 has a capacitance value of 250 microfarads. Lower values of capacitance for capacitor 6-C5 in relation to the values of resistors 6-R8 and 6-R9, as for example 60 microfarads, will raise the frequency below which the amplification drops rapidly; and just above this higher cut-off frequency, the amplifier will exhibit a rather broad peaking of the response characteristic as a function of frequency. A rise in response of this kind constitutes a desirable feature from the standpoint of improving the transient and phase response, where the low frequencies are cut off.

The frequency and phase response of the playback amplifier 6-74 is shaped by the feedback circuit including network 6-R15, 6-C3, 6-R5 and 6-L2, so as to give a strongly falling characteristic in the range from about 300 cycles per second to 100 kilocycles per second, the response peaking in the neighborhood of 600 cycles per second and then sharply falling (so far as the effect of feedback circuit is concerned) until the frequency reaches a relatively low value at a frequency of 100 kilocycles per second. The effect of the feedback circuit together with the effect of resistor 6-R14 and capacitor 6-C9 in the emitter circuit of transistor 6-Q1, the effect of resistor 6-R18 and capacitor 6-C6 in the emitter circuit of transistor 6-Q3 gives an overall response characteristic to the amplifier 6-74 as a function of frequency which exhibits a very sharply rising response of increasing slope in the range above about 300 kilocycles per second to the upper limits of the system which upper limit may be in the range from 1.5 megacycles per second to 4.5 megacycles per second.

As previously described, when the windings such as 6-24 and 6-64 on the head unit 6-20 are connected in "bucking" relation with respect to low frequencies, the phase of the induced voltage in winding 6-64 undergoes a reversal as a function of frequency as the frequency is increased through the resonance value for the winding 6-64, so that the induced voltage in winding 6-64 aids the induced voltage in winding 6-24 at high frequencies between the resonance frequency of winding 6-64 and the resonance frequency of winding 6-24. The amplifier frequency response and phase response is shaped to complement that of the head, giving smooth response, uniform delay, and a good transient response over the frequency spectrum of interest.

It has been found that an advantageous characteristic may also be obtained from a series aiding connection of a low impedance and a high impedance winding such as windings 6-24 and 6-64 of head unit 6-20 if certain cirteria are met: (1) the resonant frequencies of the windings must be spaced properly; and (2) the resistive loading especially on the high impedance winding such as 6-64 must be enough so that phase reversal of the net output from the windings does not take place in the transition frequency spectrum where both windings are contributing substantially to the output.

If winding 6-64 is reversed to give series aiding operation, the phase of the output from the preamplifier 6-74 will be reversed. An additional stage of amplification will restore the correct phase, or other suitable change in the circuitry may be used as for example the switching in FIG. 5.

Referring to FIG. 6B, the diodes 6-D3 and 6-D4 in the clamp circuit are preferably of the silicon junction type having a very high resistance in the forward direction until the forward potential exceeds about 0.5 volt to 0.7 volt. This feature has been found very advantageous, as it allows a precise setting of the sync pedestal level and still permits the picture signal to make large excursions without clipping. An example of a preferred type for diodes 6-D3 and 6-D4 is the 1N463A. The horizontal sync pulses from the plate of the tube 6-V304B (pin 3) are supplied to the clamp circuit via capacitor 6-C38. The magnitude of the pulses is about twelve volts peak (relative to ground). The clamp circuit including diodes 6-D3 and 6-D4 sets the negative level of the output video signal from the playback amplifier 6-74 as well as providing a direct current bias for the video amplifier tube 6-V304A in the television receiver 600 during playback operation. As indicated in FIGS. 6A and 6B, only one clamp circuit is provided in the system, and this is preferably associated with the output of the monochrome playback amplifier 6-74. With this arrangement, it will be apparent that the system of FIGS. 6A and 6B may be utilized to record and playback monochrome broadcast television signals as well as color signals. This takes place automatically when recording while the TV set 600 is picking up a monochrome signal. By switching out of the circuit the X and Z heads during recording and playback, and setting the head 6-20 to cover successive channels including those which would otherwise be used by the color signals, more recording time is obtained on a given roll of tape.

The flutter in the tape transport may cause deviations in the desired rate of the synchronizing pulses in the reproduced video signal. FIG. 6B indicates at 6-256 modifications in the horizontal control circuit (associated with tube 6-V502) of the television receiver. These modifications enable the horizontal sync circuits of the receiver to follow any deviations in the reproduced sync pulses.

When the cable is unplugged from the adaptor circuitry 6-255 the receiver circuitry 600 may be utilized independently of the circuitry of FIG. 6A to receive and display broadcast television signals. In this case, the switches of the adaptor circuitry 6-255 are placed in record mode. If the various switches are relay operated, as shown, their normal positions would be in the record mode, and unplugging of the cable 6-256 would deenergize the relay or relays to automatically place the adaptor circuitry 6-255 in the record mode. Suitable relay coils are indicated at 6-RC1 and 6-RC2 in FIG. 6B and these relays are shown as being energized from the power supply 6-5, FIG. 6A, via conductors 640 and 6-327. The relay coils preferably control each of record-play selector switches, moving the switches from "R" to "P" position when energized. Simply by way of example when the cable is coupled to the adaptor 6-255, the relays may be energized to place the circuitry of adaptor 6-255 in playback mode by actuating the record-play switch controlling the contacts in FIG. 6A. The circuitry of FIG. 6A is preferably adjacent the tape deck, and the selector switches of FIG. 6A are ganged for conjoint manual operation. Thus all of the record play switches in both the recorder and TV set are shifted by operating a single control.

During recording the component of magnetic biasing flux produced by the cross field windings such as 6-30 should have the proper phase relation to the component produced by bias frequency current in the recording windings such as 6-24. This may be accomplished by tuning capacitor 6-C37 associated with cross field conductor 40 in FIG. 6A. The capacitor 6-C37 forms part of a circuit having a series resonance in the region of the bias frequency, so that the phase of the bias current may be advanced or retarded by tuning capacitor 6-C37 from one side of resonance to the opposite side. In some cases it is found advantageous to increase the inductance of the X-field circuit by inserting an inductance in the lead 6-40. Alternatively, a phase shifting network may be inserted in conductors 6-40 and 6-41 of the cross field bias circuit or in the signal winding bias circuit associated with the secondary windings of transformer 6-L10.

For bi-direction tape transport, an alternative mode of operation is with the bias field component produced by corss field winding 6-30 having a phase angle of approximately 90° relative to the bias field component produced by the winding 6-24, so that the bias frequency magnetic field associated with each head unit will be similar in each direction of movement of the magnetic tape.

The circuit value of a different successfully operating system in accordance with the present invention are given in a tubulation in my application Ser. No. 528,934, and the disclosure of this system is incorporated herein by reference in its entirety as a further embodiment. As will be apparent to those skilled in the art the capacitor (C29) in the tabulation at the forty-third page of said application Ser. No. 528,934 should have a value of 0.25 microfarads in conformity with the value of capacitor 6-C29 given herein.

Capacitor 6-C15, FIG. 6A, is adjustable from 100 micromicrofarads to 1,000 micromicrofarads; a typical setting is approximately 500 micromicrofarads, where the oscillator frequency is 4.2 megacycles per second.

Capacitor 6-C35 bypasses high frequencies and is associated with the B+ lead 6-335 energizing each of the playback amplifiers; its value may be 0.05 microfarad.

The resistor 6-R17 and the corresponding resistors in X and Z playback amplifiers may be of adjustable value and may be adjusted to set the direct current operating bias of the amplifiers.

The cable may have a plug for fitting into a socket on the chassis of adaptor circuit 6-255.

In certain cases in the foregoing tabulation, a single value has been given for a variable capacitor or resistor. This single value represents a selected operating value. Suitable ranges of adjustment for these variable components are listed as follows:

| | |
|---|---|
| 6-R10 | 0 to 50 ohms |
| 6-R37 | 0 to 15,000 ohms |
| 6-R40 | 0 to 25,000 ohms |
| 6-R46 | .5 to 3 megohms |
| 6-R47 | .5 to 3 megohms |
| 6-C33 | 4 micromicrofarad to 16 micromicrofarads |
| 6-C34 | 4 micromicrofarad to 16 micromicrofarads |
| 6-R17 | 50 ohms to 2,000 ohms |
| 6-C15 | 200 micromicrofarads to 2,000 micromicrofarads |
| 6-C37 | 100 micromicrofarads to 1,000 micromicrofarads |
| 6-C109 | 9 micromicrofarads to 180 micromicrofarads |
| 6-R55 | 200 kilohms to 10 megohms |

Referring to FIG. 6B, the resistors 6-R31, 6-R36 and 6-R39 serve to maintain the upper terminals respectively of of capacitors 6-C23, 6-C27 and 6-C29 at direct current ground potential (while the circuitry is in the playback mode) so as to prevent surges through the associated head windings during switching. These coupling capacitors have appreciable direct current potential across them during recording so that in the absence of the resistors, a charging of the capacitors would occur through the associated head windings when switching the circuitry between playback and record mode. Such current surges through the head windings would tend to produce residual magnetization of the head cores. (Such residual magnetization has various detrimental effects including noise and possible partial erasure of a signal recorded on the record medium.)

Referring to the circuitry of FIGS. 6A and 6B, it will be observed that the video windings such as 6-24 have their upper terminals at direct current ground potential in the recording mode so that no current surges to the head windings will be produced where the upper terminals of the capacitors are maintained at direct current ground potential during switching.

It has been found that unmodified X and Z matrixing of the reproduced Y-R and Y-B signals as indicated in FIGS. 6A and 6B gives excellent results, particularly when color controls corresponding to the variable resistor 6-R10 in amplifier component 6-74, FIG. 6A, are used. The arrangement shown in detail in FIGS. 6A and 6B is simple and economical since it requires no power amplifiers other than those already in the commercial color television receiver. Excellent color rendition is obtained especially of orange-pink skin tones which are ordinarily difficult to reproduce even on direct broadcast reception.

In the specific circuit illustrated in FIGS. 6A and 6B, the principal color controls are variable resistors in the emitter circuits of the third transistor stage of the X and Z playback preamplifiers, (the variable resistors corresponding to the variable resistor 6-R10 of the playback circuit 6-74.) These two principal color controls are preferably ganged on concentric shafts which are frictionally engaged with each other so that the gains of the X and Z color amplifiers increase or decrease together as the knob assembly is turned; yet either of the concentric knobs may be turned individually by holding the other one back. These two controls are sufficient to change the picture from normal coloring to exaggerated color intensity, or to a light tint, or even to a monochrome rendition, according to taste. Alternatively, only the X amplifier may be provided with a variable resistor having a manual control knob on the user's external panel, the resistor corresponding to 6-R10 of the Z amplifier either having a preset value or being a fixed resistor of desired value.

Additional control of the color image during playback of a recorded tape is effected by adjustment of resistor 6–R37 and resistor 6-R40, FIG. 6B, which are used to set the background color. While these resistors may also be controlled from manual knobs on the operator's external panel they are not used as often once they have been set. The operation of the illustrated system is therefor simplified by placing the operating controls for resistors 6-R37 and 6-R40 at the side or in the back of the assembly rather than at the operator's panel. Alternatively resistors 6-R37 and 6-R40 may be replaced by fixed resistors having values of about 2,000 to 20,000 ohms depending on the design of the television receiver circuitry and the associated wiring.

The lower value of bias frequency of approximately 2.7 megacycles per second described herein which is in the frequency range of the video signals supplied to the receiver circuitry 600 had previously been considered to be too low to be operative; a bias frequency of 4 to 5 times the upper limit of the recording range being ordinarily considered optimum; or in any event it was considered that the bias frequency should be well above the upper limit of the recording range. It has been found, however, that a bias frequency of approximately 2.7 megacycles per second allows the use of high frequency bias with heads that would be unuseable at higher bias frequencies because of excessive losses and head saturation. This relatively lower bias frequency also allows the use of high frequency bias where bias of adequate amplitude would be impossible at higher bias frequencies. With the use of bias signal isolation means (such as wave traps such as 6-C14A, 6-L6*a*) the relatively lower bias frequency of approximately 2.7 megacycles per second is useable without appreciable interference with the television circuits.

FIG. 6B illustrates a particularly advantageous circuit 6-350 for recording the sound which accompanies the picture information. In FIG. 6B the standard commercial broadcast color television receiver 600 is indicated as supplying a sound signal on a 4.5 megacycle per second frequency modulation carrier at conductor 6-371, and for supplying a 3.58 megacycle per second carrier at conductor 6-372. By way of example in an RCA Model CTC16 color television chassis, conductor 6-371 may be connected to pin 1 or sound demodulator tube 6-V202, while conductor 372 may be connected to pin 7 of the X demodulator tube 6-V704. The various selector switches of the circuit of FIG. 6B are shown in their respective record positions indicated by the letter "R." For playback mode, the switches are switched to the "P" position. The circuit uses the 3.58 megacycle per second crystal controlled oscillator of the color television receiver 600 to heterodyne the 4.5 megacycle per second frequency modulated sound to 0.92 megacycles per second, the latter being a carrier that is readily recorded by means of a relatively low speed viedo tape recorder such as shown in my copending application Ser. No. 528,934. For playback, the 0.92 megacycle per second frequency modulated sound carrier may be changed to a sound signal by an appropriate discrminator and detector, or for simplicity may be heterodyned back to 4.5 megacycles per second and the circuits of receiver 600 are utilized for demodulation. With the switches in the record (R) position, circuit 6-L101, 6-C108 tuned to approximately 4.5 megacycles per second is connected to the base of transistor 6-Q10 which may be a type 2N3856A. The circuit 6-L102, 6-C111 is tuned to 3.58 megacycles per second and is connected to the emitter circuit of transistor 6-Q10. The circuit 6-L103, 6-C110, 6-C109 is connected to the colector during recording and supplies as much as 70 volts peak to peak signal in the 0.92 megacycle tank circuit that is coupled via capacitor 6-C103 to one of the recording head circuits, which may be the Z color signal recording head circuit.

During playback the switches are in the P position, connecting the base of transistor 6-Q10 which again acts as a mixer circuit to the 0.92 megacycle per second tank circuit including inductor 6-L103 and capacitor 6-C110. It has been found that different tuning is optimum for playback as compared to recording, so that capacitor 6-C109 is disconnected during playback. For example during recording the tank circuit 6-L103, 6-C109, 6-C110 may be peaked at a frequency above 0.92 megacycles per second so that its output voltage at 0.92 megacycles per second is 50 percent of the peak value; and similarly 6-L101, 6-C108 may be peaked at 4.5 megacycles per second, or at a frequency above 4.5 megacycles per second such that its output voltage at 4.5 megacycles per second is 50 percent of peak value. During playback inductors 6-L101 and 6-L103 are adjusted for minimum distortion and good volume of sound. The 4.5 megacycle frequency modulated output is thus fed via capacitor 6-C102 and conductor 6-371 to the TV set sound discriminator, detector, audio amplifier, and loudspeaker. It has been found that the sound and color signal do not interfere with each other when recorded and played back on the same magnetic recording track. However, filter elements may be used to isolate the sound carrier from the video if desired. The conductors 6-377 and 6-378 in FIG. 6B connect to terminals designated by the circled numbers 8 and 15 in the cable between the recorder and TV set in the present system and in the system of application Ser. No. 528,934 filed Feb. 21, 1966 in which this sound system may be used. Another sound channel for stereo may be used with the other color channel.

Having reference to FIG. 6A, the tape recording and playback circuits and the record-playback video coupling circuits component 6-380 of FIG. 6A may be used for the circuit illustrated in the fourth figure of my copending application Ser. No. 528,934. In this latter case, the audio circuitry of FIG. 6B would preferably be located in the adaptor circuit (255) of part *b* of the fourth figure of said copending application. Conductor 6-377 would lead to conductor number (8) of cable (256) of said part *b*. Thus conductor 6-377 would be connected to the juncture of inductor (L6C) and conductor (38) of part *a* of said fourth figure, so that the audio signal on the 0.92 megacycle per second carrier would be supplied through secondary winding (23*c*) to conductor (39). The conductor (39) would then connect to a head unit such as indicated at (22) in the first figure of said copending application through a selector switch having record and play positions as indicated in said part *a*. The winding (26) would have its upper terminal grounded through a record-play selector switch in the same was as illustrated for winding (24) in said part *a*.

During playback, the aforementioned selector switches would be in the play position so as to connect windings (26) and (66) of the head (22) shown in the second figure of said copending application to a playback amplifier such as indicated at (76) in said second figure. The output of this playback amplifier (76) would supply the playback signal to conductor 6-378 of FIG. 6B whereupon the sound signal on the 0.92 megacycle carrier would be coupled through capacitor 6-C104 to the tank circuit 6-L103, 6-C110. The resulting sound signal with a 4.5 megacycle per second carrier would be supplied through capacitor 6-C102 and via conductor 6-371 to the television set 600, for example to pin 1 of sound demodulator tube 6-V202 of the RCA Model CTC16 chassis. Conductor 6-372 would be connected to pin 7 of the X demodulator tube 6-V704 of the same chassis so as to receive the 3.58 megacycle per second signal which heterodynes with the 0.92 megacycle per second carrier to give the 4.5 megacycle per second modulated sound signal.

Referring to FIG. 6A, conductor 6-383 serves to couple the output of the B-Y amplifier tube 6-V706B of said chassis to the Z recording head. In this case conductor 6-384, FIG. 6B, leading from the receiver 600 would be connected to pin 6 of tube 6-V706B of said chassis. Similarly, the reproduced and amplifier color video signal on conductor 6-386 is connected to capacitor 6-155 and pin 7 of 6-V706B. In part *b* of the fourth figure of said copending application conductor 6-386 would connect to conductor (216) which leads to a capacitor (155) and then to pin 7 of the tube V706B of said chassis.

With this arrangement, the separate audio head, audio amplifier and audio biasing system of said copending application could be omitted.

It has been found advantageous for noise reduction to connect a series inductor and capacitor between the plate of audio output tube V106 and ground, of said chassis, the inductor having a value of about 0.15 henry and the capacitor having a value of about 0.0025 microfarads.

The foregoing specifc circuitry is, of course, simply given by way of specific example. The embodiments disclosed with respect to the thirteenth figure of my copending application Ser. No. 545,050 filed Apr. 25, 1966 (now U.S. Pat. No. 3,484,546 issued Dec. 16, 1969) are other example.

Referring to the embodiment of the thirteenth figure of my application Ser. No. 545,050, a sound and color picture was recorded and played back using the circuit specifically described as wherein the various components had values as follows (R1), 0-560,000 ohms; (R2), 15,000 ohms; (R3), 470 ohms; (R4), 560 ohms; (R5), 470 ohms; (C3), 0.02 microfarads; (C4A) and (C4B) each 9 micromicrofarads to 180 micromicrofarads; (C5), 9 micromicrofarads to 180 micromicrofarads; each of (C6A) and (6Cb), 80 micromicrofarads to 480 micromicrofarads; (C7), 0.02 microfards; (C8A), 10 micromicrofarads; (C8B), 10 micromicrofarads; (C9), 0.05 microfarads; (C10), 5 micromicrofarads; (C11), 5 micromicrofarads; (L1), 28 turns; (L2), 28 turns, (L3), 24 turns below the tap and 50 turns above the tap; (L1) and (L2) being wound on a ¼ inch diameter by 1 inch long powdered iron coil form, and (L3) on a ⅜ by 1 inch long powdered iron coil form. The small capacitances (C10) and (C11) couple the high frequency TV receiver circuits to the shielded cables which are part of the turned circuits of said thirteenth figure with negligible disturbance to the receiver circuits.

Referring to the embodiment of the thirteenth figure of Ser. No. 545,050, detuning of the tank circuits during recording leads to implitude modulation as well as frequency modulation being recorded on the magnetic record tape of component (375). This has been found beneficial in some cases. The sound circuit may be modified to generate its own oscillations in case the 3.58 megacycle per second source is not available (as in monochrome TV sets) or in case a different frequency is desirable. This may be done by inserting a few turns at (L4) in the collector circuit of (T1) and coupling them to coil (L2), with proper feedback polarity to produce oscillations tuned by (L2) and (C5) to a desired frequency such as near 3.58 megacycles per second. Switch (S5) is opened for this mode of operation, and lead (372) is not used.

It will be understood that while specific frequencies, etc., have been used in various examples for clarity, others may be chosen that utilize the illustrated principles advantageously.

It will be apparent that many modifications and variations may be effected without departing from the scope of the novel concepts of the present invention.

I claim as my invention:

1. In a transducing system including a broadcast television receiver having a television signal circuit along which a television signal is transmitted when the receiver is tuned to a broadcast television signal, a video transducer device comprising a video transducer head for coupling to a record medium, and coupling means for coupling the television signal circuit of said receiver to the transducer head for recording of the television signal on the record medium, and for connecting said transducer head to said signal circuit during playback of the television signal recorded on the record medium for display by means of said television receiver of the image represented by the recorded signal, the improvement of said coupling means comprising adapter circuitry physically disposed closely adjacent said broadcast television receiver and operable to reduce loading of the television signal circuit by the connection to the transducer device during recording, said coupling means including switches for selectively conditioning said coupling means for recording and playback operation, said switches in an enabling condition enabling use of the receiver for the reception and display of a broadcast television signal, and further comprising a detachable cable for interconnecting said adapter circuitry with said transducer device during recording and playback operation, and means for placing said switches in said enabling condition when said video transducer device is disconnected by detachment of said cable.

2. In a transducing system including a broadcast television receiver having a television signal circuit along which received broadcast television signals are transmitted when the receiver is tuned to respective broadcast television stations, a video transducer device for recording and reproducing television signals, and coupling means for coupling the television signal circuit of said receiver to the transducer device for recording of the received broadcast television signals and for connecting said transducer device to said television signal circuit for display by means of said television receiver of the recorded television signals, the improvement of said coupling means comprising adapter circuit elements physically disposed closely adjacent said television signal circuit, said adapter circuit elements being operable to reduce loading of the television signal circuit by the connection thereof to the transducer device in recording mode, said coupling means further comprising switches selectively actuable to first and second conditions for selectively conditioning said coupling means for recording and playback operation, respectively, said switches in the second condition serving to interrupt the transmission of received broadcast television signals to said television signal circuit and to transmit the television signal reproduced by said transducer device to said television signal circuit, and in the first condition serving to restore transmission of received broadcast television signals to said television signal circuit for simultaneous display by means of said television receiver and recording by means of said transducer device, said coupling means including a detachable cable for connecting and disconnecting said television signal circuit and said transducer device, and means for placing said switches in said first condition when said cable is detached to disconnect said transducer device from said television receiver thereby enabling transmission of received broadcast television signals to said television signal circuit, and a single actuator coupled with said switches and operable while the cable remains fixed in the connecting attached condition for selectively placing the switches in said first and second conditions, the switches also being actuatable to said first condition in response to operation of said single actuator when the cable is detached.

3. In a transducing system including a broadcast television receiver having a television signal circuit along which a television signal is transmitted when the receiver is tuned to a broadcast television signal, a video transducer device, and coupling means for coupling the television signal circuit of said receiver to said video transducer device during a recording transducing operation, and for connecting said transducer device to said signal circuit during a playback transducing operation, said video transducer device comprising a magnetic tape transport for moving a magnetic tape along a transducing path at a video transducing speed, a magnetic transducer head comprising a video magnetic transducer head unit for operative scanning relation to successive channels on a magnetic record tape to provide at least 10 video channels per quarter inch of tape width for sequential scanning by said video magnetic transducer head unit, a video playback amplifier having an amplifier input for coupling with said video magnetic transducer head unit during playback transducing operation and having an amplifier output, and transducer head switching means interposed between said video magnetic transducer head unit and said video playback amplifier and shiftable between a playback mode and a recording mode, said switching means in said playback mode connecting said magnetic transducer head unit with said amplifier input, and having a recording signal input and operable in said recording mode for connecting said recording signal input with said transducer head unit, said coupling means comprising an adapter unit physically disposed closely adjacent said broadcast television receiver, and a pair of conductors leading from open circuit points of the television signal circuit of the television receiver and entering said adapter unit such that received broadcast television signals are transmitted via one of said pair of conductors from the television signal circuit to the adapter unit, the other of said pair of conductors being operable to transmit video signals to said television signal circuit for display by the broadcast television receiver, and adapter unit switch means in said adapter unit for selectively conditioning said coupling means for recording and playback transducing operation and connected with said pair of conductors and with said recording signal input and with said amplifier output, and being shiftable between a recording mode and a playback mode, said adapter unit switch means being operable in said recording mode simultaneously to connect the television signal circuit to the recording signal input of said transducer head switching means and to connect said one of said pair of conductors to the other of said pair of conductors to establish continuity between said open circuit points of said television signal circuit, and said adapter unit switch means in said playback mode being operable to interrupt continuity between said pair of conductors to prevent display of a received broadcast television signal, and to connect said amplifier output with said other of said pair of conductors for display of a video signal reproduced from a magnetic record tape by means of said magnetic transducer head unit, and said coupling means including a cable having a first conductor extending between said adapter unit switch means and said recording signal input of said transducer head switching means for transmitting a television signal, which is derived from a received broadcast television signal, from the television signal circuit of the receiver to said recording signal input of said transducer head switching means, and having a second conductor extending between said amplifier output and said adapter unit switch means for transmitting a reproduced video signal from said amplifier output of said video playback amplifier to said adapter unit switch means.

4. The system of claim 3 with said adapter unit containing only passive electric circuit components and said adapter unit switch means.

5. The system of claim 3 with the open circuit points of the television signal circuit being in the input of a video amplifier of said broadcast television receiver, and said adapter unit switch means being connected with the output of said video amplifier of said broadcast television receiver and being operable in playback mode to supply the reproduced video signal from the magnetic transducer head unit to the input of said video amplifier to said broadcast television receiver, and being operable during record mode to supply and amplified video signal from the output of said video amplifier of said broadcast television receiver to said magnetic transducer head unit.

6. A system according to claim 3 with said video playback amplifier having characteristics matched to said video magnetic transducer head unit to provide response over a bandwidth extending from a frequency of the order of 300 cycles per second to an upper frequency in the megacycle range.

7. A system according to claim 3 with said coupling means being operable for coupling respective color video signal circuits of the broadcast television receiver which carry demodulated color television signals to said adapter unit switch means for recording of the demodulated color video signals by means of said magnetic transducer head in recording mode of said adapter unit switch means, and said adapter unit including matching networks for adapting said demodulated color video signals to said magnetic transducer head.

8. A system according to claim 7 with said coupling means supplying at least one of said demodulated color video signals from said broadcast television receiver to said magnetic transducer head directly without additional amplification.

9. A system according to claim 7 with said coupling means including means for removing synchronizing pulses from the demodulated color video signals prior to recording thereof by means of said magnetic transducer head.

10. A system according to claim 7 with a pair of color signal playback amplifiers for amplifying reproduced color video signals from the magnetic transducer head, gain controls for the respective color signal playback amplifiers, and means ganging said gain controls together for joint operation.

11. A system according to claim 7 with a color signal playback amplifier for amplifying a reproduced color video signal from the magnetic transducer head and having a color signal amplifier output, and said cable having a further conductor extending between said color signal amplifier output and said adapter unit for transmitting the reproduced and amplified color video signal to said broadcast television receiver during playback transducing operation.

12. A system according to claim 3 with said coupling means comprising a clamp circuit in said adapter unit for modifying the reproduced video signal prior to transmission to said broadcast television receiver.

13. A system according to claim 12 with said clamp circuit having junction diodes which do not conduct substantially in the forward direction until a voltage of 0.5 to 0.7 volts is exceeded.

14. A system according to claim 12 with means separate from the reproduced video signal for driving said clamp circuit to conduction at intervals related to the horizontal line rate of the reproduced video signal.

15. A system according to claim 3 with said magnetic transducer head having only two magnetic transducer head units for reproducing only a monochrome television signal and one color video signal for transmission to said adapter unit, and said cable having said second conductor for transmitting the reproduced monochrome television signal to said adapter unit and having a third conductor for transmitting the reproduced color video signal to said adapter unit.

16. In a transducing system including a broadcast television receiver having a television signal circuit along which a television signal is transmitted when the receiver is tuned to a broadcast television signal, a video transducer device including a video magnetic transducer head, and coupling means for coupling the television signal circuit of said receiver with said video magnetic transducer head of said video transducer device during a playback transducing operation, said video transducer device including a video playback circuit having an input for coupling with said video magnetic transducer head during playback transducing operation and having an output, said coupling means comprising adapter circuitry including a pair of conductors leading from open circuit points of the television signal circuit of the television receiver such that received broadcast television signals are transmitted via one of said pair of conductors from the television signal circuit to the adapter circuitry, the other of said pair of conductors being operable to transmit video signals to said television signal circuit for display by the broadcast television receiver, and adapter switch means connected with said adapter circuitry for selectively conditioning said coupling means for a playback transducing operation and connected with said pair of conductors and with said output, and being shiftable between a broadcast reception mode and a playback mode, said adapter switch means being operable in said broadcast reception mode to connect said one of said pair of conductors to the other of said pair of conductors to establish continuity between said open circuit points of said television signal circuit, and said adapter switch means in said playback mode being operable to interrupt continuity between said pair of conductors to prevent display of a received broadcast television signal, and to connect said output of said video playback circuit with said other of said pair of conductors for display of a video signal reproduced from a magnetic record by means of said video magnetic transducer head.

17. A transducing system according to claim 16 with said broadcast television receiver having receiver horizontal sync circuits coupled with the television signal circuit for producing horizontal sync pulses in accordance with the horizontal synchronizing component of a video signal transmitted along said television signal circuit, said adapter circuitry further including an adapter horizontal sync circuit connected with said receiver horizontal sync circuits for supplying horizontal sync pulses therefrom, and means connecting said adapter horizontal sync circuit of said adapter circuitry with said video playback circuit of said video transducer device for supplying horizontal sync pulses from said receiver horizontal sync circuits to said video playback circuit of said video transducer device during a playback transducing operation.

* * * * *